US012230201B2

(12) United States Patent
Zhang et al.

(10) Patent No.: US 12,230,201 B2
(45) Date of Patent: Feb. 18, 2025

(54) PIXEL CIRCUIT AND DRIVING METHOD THEREOF, DISPLAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Tiaomei Zhang, Beijing (CN); Dan Cao, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/027,128

(22) PCT Filed: Apr. 19, 2022

(86) PCT No.: PCT/CN2022/087747

§ 371 (c)(1),
(2) Date: Mar. 20, 2023

(87) PCT Pub. No.: WO2023/201535

PCT Pub. Date: Oct. 26, 2023

(65) Prior Publication Data

US 2024/0347000 A1 Oct. 17, 2024

(51) Int. Cl.
*G09G 3/3233* (2016.01)

(52) U.S. Cl.
CPC ..... *G09G 3/3233* (2013.01); *G09G 2310/061* (2013.01); *G09G 2310/08* (2013.01);
(Continued)

(58) Field of Classification Search
CPC .................................................... G09G 3/3233
See application file for complete search history.

(56) References Cited

U.S. PATENT DOCUMENTS

2021/0390906 A1 12/2021 Pyun et al.
2022/0319419 A1* 10/2022 Xiang .................. G09G 3/3241
2022/0366830 A1 11/2022 Zhang et al.

FOREIGN PATENT DOCUMENTS

CN 111696486 A 9/2020
CN 112382237 A 2/2021
(Continued)

*Primary Examiner* — Kevin M Nguyen
(74) *Attorney, Agent, or Firm* — Ling Wu; Stephen Yang; Ling and Yang Intellectual Property

(57) ABSTRACT

A pixel circuit and a driving method thereof, a display substrate and a display apparatus are provided, wherein the pixel circuit includes a first node control sub-circuit, a second node control sub-circuit, a light emitting control sub-circuit and a driving sub-circuit; the working process of the pixel circuit includes: a first initialization stage, a data writing stage, a second initialization stage and a light emitting stage; the second node control sub-circuit is configured to provide the signal of the second initial signal terminal to the fourth node under the control of the second reset signal terminal; the second initialization stage occurs between the data writing stage and the light emitting stage, and the signal of the second reset signal terminal is an effective level signal in the second initialization stage.

20 Claims, 11 Drawing Sheets

(52) U.S. Cl.
CPC ............... *G09G 2320/0233* (2013.01); *G09G 2320/0247* (2013.01); *G09G 2330/021* (2013.01)

(56) References Cited

FOREIGN PATENT DOCUMENTS

| | | | |
|---|---|---|---|
| CN | 112634833 | A | 4/2021 |
| CN | 113611247 | A | 11/2021 |
| CN | 113851082 | A | 12/2021 |
| CN | 113921574 | A | 1/2022 |
| CN | 114038383 | A | 2/2022 |

* cited by examiner

PIXEL CIRCUIT AND DRIVING METHOD THEREOF, DISPLAY SUBSTRATE AND DISPLAY APPARATUS

CROSS-REFERENCE TO RELATED APPLICATION

The present application is a U.S. National Phase Entry of International Application No. PCT/CN2022/087747 having an international filing date of Apr. 19, 2022. The above-identified application is hereby incorporated by reference.

TECHNICAL FIELD

The present disclosure relates to but is not limited to the field of display technologies, in particular to a pixel circuit and a driving method thereof, a display substrate and a display apparatus.

BACKGROUND

An Organic Light Emitting Diode (OLED for short) and a Quantum-dot Light Emitting Diode (QLED for short) are active light emitting display devices and have advantages such as self-luminescence, wide viewing angle, high contrast ratio, low power consumption, very high response speed, lightness and thinness, flexibility, and low costs. With constant development of display technologies, a flexible display that uses an OLED or a QLED as a light emitting device and performs signal control by a Thin Film Transistor (TFT for short) has become a mainstream product in the field of display at present.

SUMMARY

The following is a summary of subject matter described herein in detail. The summary is not intended to limit the protection scope of claims.

In a first aspect, the present disclosure provides a pixel circuit configured to drive a light emitting element to emit light, the pixel circuit includes: a first node control sub-circuit, a second node control sub-circuit, a light emitting control sub-circuit and a driving sub-circuit; the working process of the pixel circuit includes a first initialization stage, a data writing stage, a second initialization stage and a light emitting stage;

The first node control sub-circuit is electrically connected with a first power supply terminal, a first reset signal terminal, a first initial signal terminal, a scanning signal terminal, a data signal terminal, a first node, a second node and a third node respectively, and is configured to provide the signal of the first initial signal terminal to the first node under the control of the first reset signal terminal, provide the signal of the third node to the first node and the signal of the data signal terminal to the second node under the control of the scanning signal terminal;

The second node control sub-circuit is electrically connected with a second reset signal terminal, a second initial signal terminal and a fourth node respectively, and is configured to provide the signal of the second initial signal terminal to the fourth node under the control of the second reset signal terminal;

The driving sub-circuit is electrically connected with the first node, the second node, and the third node respectively, and is configured to provide a driving current to the third node under control of the first node and the second node.

The light emitting control sub-circuit is electrically connected with a light emitting signal terminal, the first power supply terminal, the second node, the third node and the fourth node respectively, and is configured to provide the signal of the first power supply terminal to the second node and the signal of the third node to the fourth node under the control of the light emitting signal terminal;

The light emitting element is electrically connected with the fourth node and the second power supply terminal respectively;

The second initialization stage is between the data writing stage and the light emitting stage, and the signal of the second reset signal terminal is an effective level signal in the second initialization stage, and the signal of the second reset signal terminal and the signal of the light emitting signal terminal are mutually inverted signals in the second initialization stage.

In some possible implementations, the second node control sub-circuit is further electrically connected with the third node, and is further configured to provide the signal of the second initial signal terminal to the third node under the control of the second reset signal terminal.

In some possible implementations, a signal of the first reset signal terminal is an effective level signal in the first initialization stage, a signal of the scanning signal terminal is an effective level signal in the data writing stage, and the signal of the light emitting signal terminal is an effective level signal in the light emitting stage;

When the signal of the second reset signal terminal is an effective level signal, the signal of the light emitting signal terminal is an invalid level signal, and when the signal of the light emitting signal terminal is an effective level signal, the signal of the second reset signal terminal is an invalid level signal;

The frequency at which the signal of the light emitting signal terminal is an effective level signal is the same as the frequency at which the signal of the second reset signal terminal is an effective level signal.

In some possible implementations, the first node control sub-circuit includes a first transistor, a second transistor, a fourth transistor and a capacitor, and the capacitor includes a first plate and a second plate; the driving sub-circuit includes a third transistor, and the light emitting control sub-circuit includes a fifth transistor and a sixth transistor;

A control electrode of the first transistor is electrically connected with the first reset signal terminal, a first electrode of the first transistor is electrically connected with the first initial signal terminal, and a second electrode of the first transistor is electrically connected with the first node;

A control electrode of the second transistor is electrically connected with the scanning signal terminal, a first electrode of the second transistor is electrically connected with the first node, and a second electrode of the second transistor is electrically connected with the third node;

A control electrode of the third transistor is electrically connected with the first node, a first electrode of the third transistor is electrically connected with a second node, and a second electrode of the third transistor is electrically connected with the third node;

A control electrode of the fourth transistor is electrically connected with the scanning signal terminal, a first electrode of the fourth transistor is electrically connected with the data signal terminal, and a second electrode of the fourth transistor is electrically connected with the second node;

A control electrode of the fifth transistor is electrically connected with the light emitting signal terminal, a first electrode of the fifth transistor is electrically connected with the first power supply terminal, and a second electrode of the fifth transistor is electrically connected with the second node;

A control electrode of the sixth transistor is electrically connected with the light emitting signal terminal, a first electrode of the sixth transistor is electrically connected with the third node, and a second electrode of the sixth transistor is electrically connected with the fourth node;

The first plate of the capacitor is electrically connected with the first node, and the second plate of the capacitor is electrically connected with the first power supply terminal.

In some possible implementations, the second node control sub-circuit includes a seventh transistor;

A control electrode of the seventh transistor is electrically connected with the second reset signal terminal, a first electrode of the seventh transistor is electrically connected with the second initial signal terminal, and a second electrode of the seventh transistor is electrically connected with the fourth node.

In some possible implementations, the second node control sub-circuit includes a seventh transistor and an eighth transistor;

A control electrode of the seventh transistor is electrically connected with the second reset signal terminal, a first electrode of the seventh transistor is electrically connected with the second initial signal terminal, and a second electrode of the seventh transistor is electrically connected with the fourth node;

A control electrode of the eighth transistor is electrically connected with the second reset signal terminal, a first electrode of the eighth transistor is electrically connected with the second initial signal terminal, and a second electrode of the eighth transistor is electrically connected with the third node.

In some possible implementations, the first node control sub-circuit includes a first transistor, a second transistor, a fourth transistor and a capacitor, and the capacitor includes a first plate and a second plate; the driving sub-circuit includes a third transistor, the light emitting control sub-circuit includes a fifth transistor and a sixth transistor, and the second node control sub-circuit includes a seventh transistor;

A control electrode of the first transistor is electrically connected with the first reset signal terminal, a first electrode of the first transistor is electrically connected with the first initial signal terminal, and a second electrode of the first transistor is electrically connected with the first node;

A control electrode of the second transistor is electrically connected with the scanning signal terminal, a first electrode of the second transistor is electrically connected with the first node, and a second electrode of the second transistor is electrically connected with the third node;

A control electrode of the third transistor is electrically connected with the first node, a first electrode of the third transistor is electrically connected with the second node, and a second electrode of the third transistor is electrically connected with the third node;

A control electrode of the fourth transistor is electrically connected with the scanning signal terminal, a first electrode of the fourth transistor is electrically connected with the data signal terminal, and a second electrode of the fourth transistor is electrically connected with the second node;

A control electrode of the fifth transistor is electrically connected with the light emitting signal terminal, a first electrode of the fifth transistor is electrically connected with the first power supply terminal, and a second electrode of the fifth transistor is electrically connected with the second node;

A control electrode of the sixth transistor is electrically connected with the light emitting signal terminal, a first electrode of the sixth transistor is electrically connected with the third node, and a second electrode of the sixth transistor is electrically connected with the fourth node;

A control electrode of the seventh transistor is electrically connected with the second reset signal terminal, a first electrode of the seventh transistor is electrically connected with the second initial signal terminal, and a second electrode of the seventh transistor is electrically connected with the fourth node;

The first plate of the capacitor is electrically connected with the first node, and the second plate of the capacitor is electrically connected with the first power supply terminal.

In some possible implementations, the first node control sub-circuit includes a first transistor, a second transistor, a fourth transistor and a capacitor, and the capacitor includes a first plate and a second plate; the driving sub-circuit includes a third transistor, the light emitting control sub-circuit includes a fifth transistor and a sixth transistor, and the second node control sub-circuit includes a seventh transistor and an eighth transistor;

A control electrode of the first transistor is electrically connected with the first reset signal terminal, a first electrode of the first transistor is electrically connected with the first initial signal terminal, and a second electrode of the first transistor is electrically connected with the first node;

A control electrode of the second transistor is electrically connected with the scanning signal terminal, a first electrode of the second transistor is electrically connected with the first node, and a second electrode of the second transistor is electrically connected with the third node;

A control electrode of the third transistor is electrically connected with the first node, a first electrode of the third transistor is electrically connected with the second node, and a second electrode of the third transistor is electrically connected with the third node;

A control electrode of the fourth transistor is electrically connected with the scanning signal terminal, a first electrode of the fourth transistor is electrically connected with the data signal terminal, and a second electrode of the fourth transistor is electrically connected with the second node;

A control electrode of the fifth transistor is electrically connected with the light emitting signal terminal, a first electrode of the fifth transistor is electrically connected with the first power supply terminal, and a second electrode of the fifth transistor is electrically connected with the second node;

A control electrode of the sixth transistor is electrically connected with the light emitting signal terminal, a first electrode of the sixth transistor is electrically connected with the third node, and a second electrode of the sixth transistor is electrically connected with the fourth node;

A control electrode of the seventh transistor is electrically connected with the second reset signal terminal, a first electrode of the seventh transistor is electrically connected with the second initial signal terminal, and a second electrode of the seventh transistor is electrically connected with the fourth node;

A control electrode of the eighth transistor is electrically connected with the second reset signal terminal, a first electrode of the eighth transistor is electrically connected with the second initial signal terminal, and a second electrode of the eighth transistor is electrically connected with the third node;

The first plate of the capacitor is electrically connected with the first node, and the second plate of the capacitor is electrically connected with the first power supply terminal.

In a second aspect, the present disclosure further provides a display substrate, which includes a base substrate, and a circuit structure layer and a light emitting structure layer sequentially arranged on the base substrate, the light emitting structure layer includes light emitting elements, and the circuit structure layer includes the pixel circuits arranged in an array described above.

In some possible implementations, the display substrate further includes a plurality of first reset signal lines, a plurality of second reset signal lines, a plurality of scanning signal lines, a plurality of light emitting signal lines, a plurality of first initial signal lines and a plurality of second initial signal lines extending in a first direction and arranged in a second direction, and a plurality of first power supply lines and a plurality of data signal lines extending in the second direction and arranged in the first direction; the first direction and the second direction are intersected;

The first reset signal terminal of the pixel circuit is electrically connected with the first reset signal line, the second reset signal terminal is electrically connected with the second reset signal line, the scanning signal terminal is electrically connected with the scanning signal line, the light emitting signal terminal is electrically connected with the light emitting signal line, the first initial signal terminal is electrically connected with the first initial signal line, the second initial signal terminal is electrically connected with the second initial signal line, the first power supply terminal is electrically connected with the first power supply line, and the data signal terminal is electrically connected with the data signal line.

In some possible implementations, when the pixel circuit includes a first transistor to an eighth transistor and a capacitor, the circuit structure layer includes a semiconductor layer, a first insulating layer, a first conductive layer, a second insulating layer, a second conductive layer, a third insulating layer, a third conductive layer, a planarization layer and a fourth conductive layer which are sequentially stacked on the base substrate;

The semiconductor layer includes an active layer of the first transistor to an active layer of the eighth transistor located in at least one pixel circuit;

The first conductive layer includes a first reset signal line, a second reset signal line, a scanning signal line, a light emitting signal line, and a first plate of the capacitor and a control electrode of the first transistor to a control electrode of the eighth transistor located in at least one pixel circuit;

The second conductive layer includes a first initial signal line, a second initial signal line, and a second plate of the capacitor located in at least one pixel circuit, wherein the second plates of capacitors of adjacent pixel circuits located in a same row are connected;

The third conductive layer includes a first electrode and a second electrode of the first transistor, a first electrode of the second transistor, a first electrode of the fourth transistor, a first electrode of the fifth transistor, a second electrode of the sixth transistor, a first electrode and a second electrode of the seventh transistor, and the first electrode and second electrode of the eighth transistor.

The fourth conductive layer includes a first power supply line and a data signal line.

In some possible implementations, the active layer of the transistor includes a channel region and a first electrode connection part and a second electrode connection part respectively located at two sides of the channel region;

The first electrode connection part of the active layer of the third transistor is multiplexed as the first electrode of the third transistor, the second electrode of the fourth transistor and the second electrode of the fifth transistor;

The second electrode connection part of the active layer of the third transistor is multiplexed as the second electrode of the second transistor, the second electrode of the third transistor and the first electrode of the sixth transistor.

In some possible implementations, the first reset signal line and the scanning signal line connected to the pixel circuit are located on a same side of the first plate of the pixel circuit, and the first reset signal line is located on the side of the scanning signal line away from the first plate of the pixel circuit;

The light emitting signal line and the second reset signal line connected to the pixel circuit are located on the side of the first plate of the pixel circuit away from the scanning signal line, and the second reset signal line is located on the side of the light emitting signal line away from the first plate of the pixel circuit;

The first initial signal line and the second initial signal line connected to the pixel circuit are respectively located on opposite sides of the second plate of the capacitor of the pixel circuit, and the second initial signal line connected to the pixel circuit in row i−1 is located between the first initial signal line connected to the pixel circuit in row i and the second plate of the capacitor of the pixel circuit in row i;

The orthographic projection of the first reset signal line connected to the pixel circuit in row i on the base substrate is located between the orthographic projection of the first initial signal line connected to the pixel circuit in row i on the base substrate and the orthographic projection of the second initial signal line connected to the pixel circuit in row i−1 on the base substrate;

The orthographic projection of the scanning signal line connected to the pixel circuit in row i on the base substrate is located between the orthographic projection of the second initial signal line connected to the pixel circuit in row i−1 on the base substrate and the orthographic projection of the second plate of the capacitor of the pixel circuit in row i on the base substrate.

In some possible implementations, the first initial signal line includes a plurality of first initial body parts and a plurality of first initial connection parts disposed at intervals and arranged in the first direction, wherein the first initial connection part is configured to connect two adjacent first initial body parts;

The length of the first initial body part in the second direction is greater than the length of the first initial connection part in the second direction;

The orthographic projection of the first initial body part on the base substrate partially overlaps the orthographic projection of the active layer of the first transistor on the base substrate, and there is no overlapping area between the orthographic projection of the first initial connection part on the base substrate and the orthographic projection of the active layer of the first transistor on the base substrate.

In some possible implementations, the second initial signal line includes a second initial body part extending in the first direction, a first connection part located at a first side of the second initial body part, and a second connection part and a third connection part located at a second side of the second initial body part, wherein the first side and the second side are oppositely disposed, and the first side is close to the second plate of the capacitor of the pixel circuit connected to the second initial signal line;

The first connection part extends in the second direction, and has an orthographic projection on the base substrate that at least partially overlaps the orthographic projection of the active layer of the first transistor on the base substrate;

The second connection part extends in the second direction, and has an orthographic projection on the base substrate that at least partially overlaps the orthographic projection of the active layer of the second transistor on the base substrate;

The third connection part extends in the second direction, and has an orthogonal projection on the base substrate that does not overlap the orthogonal projections of the active layer of the first transistor and the active layer of the second transistor on the base substrate;

The orthographic projection of the third connection part of the second initial signal line on the base substrate is located between the orthographic projection of the first electrode of the second transistor and the orthographic projection of the data signal line on the base substrate.

In some possible implementations, the first insulating layer, the second insulating layer and the third insulating layer are provided with first via to eighth via, the third via exposes the second electrode connection part of the active layer of the third transistor, the fourth via exposes the active layer of the fourth transistor, and the eighth via exposes the active layer of the eighth transistor;

A second electrode of the eighth transistor includes an electrode body part and an electrode extension part which are connected with each other, wherein the electrode body part extends in the second direction, and the included angle between the electrode body part and the electrode extension part is greater than or equal to 90 degrees or less than 180 degrees;

The electrode body part is electrically connected with the active layer of the eighth transistor through the eighth via, and has an orthographic projection on the base substrate that partially overlaps the orthographic projections of the light emitting signal line connected to the pixel circuit and the second plate of the capacitor on the base substrate;

The electrode extension part is electrically connected with the second electrode connection part of the active layer of the third transistor through the third via.

In some possible implementations, adjacent pixel circuits located in a same row with the pixel circuit include a first adjacent pixel circuit and a second adjacent pixel circuit, the first adjacent pixel circuit is located on a side of the first power supply line connected to the pixel circuit away from the data signal line, and the second adjacent pixel circuit is located on a side of the data signal line connected to the pixel circuit away from the first power supply line;

A virtual straight line extending in the second direction passes through the active layer of the eighth transistor of the pixel circuit and the fourth via of the first adjacent pixel circuit respectively;

A virtual straight line extending in the second direction passes through the electrode body part of the pixel circuit and the fourth via of the first adjacent pixel circuit respectively.

In some possible implementations, the orthographic projection of the first power supply line connected to the pixel circuit on the base substrate is located between the orthographic projection of the data signal line connected to the pixel circuit on the base substrate and the orthographic projection of the second electrode of the first transistor of the pixel circuit on the base substrate;

The orthographic projection of the first power supply line on the base substrate at least partially overlaps the orthographic projection of the third connection part of the second initial signal line on the base substrate;

The orthographic projection of the data signal line on the base substrate at least partially overlaps the orthographic projection of the electrode body part of the first adjacent pixel circuit of the pixel circuit connected to the data signal line.

In some possible implementations, at least one light emitting element includes an anode, an organic light emitting layer and a cathode; the light emitting structure layer includes an anode layer, a pixel definition layer, an organic structure layer and a cathode layer which are sequentially stacked on the base substrate; the anode layer includes an anode, the organic structural layer includes an organic light emitting layer, and the cathode layer includes a cathode;

The light emitting element includes a first light emitting element, a second light emitting element, a third light emitting element and a fourth light emitting element, the first light emitting element emits red light, the second light emitting element emits blue light, and the third light emitting element and the fourth light emitting element emit green light; the area of the anode of the second light emitting element is larger than that of the anode of the first light emitting element, and the anode of the third light emitting element and the anode of the fourth light emitting element are symmetrical about a virtual straight line extending in the first direction;

A virtual straight line extending in the first direction passes through the anode of the first light emitting element and the anode of the second light emitting element, a virtual straight line extending in the second direction passes through the anode of the first light emitting element and the anode of the second light emitting element, and a virtual straight line extending in the first direction passes through the anode of the third light emitting element and the anode of the fourth light emitting element; a virtual straight line extending in the second direction passes through the anode of the third light emitting element and the anode of the fourth light emitting element, and anodes of four second light emitting elements, anodes of two third light emitting elements and anodes of two fourth light emitting elements are disposed around the anode of the first light emitting element;

The shape of the boundary of the anode of at least one second light emitting element includes at least one rounded corner;

The pixel definition layer includes a first anode via to a fourth anode via, the first anode via exposes the anode of the first light emitting element, the second anode via exposes the anode of the second light emitting element, the third anode via exposes the anode of the third light emitting element, and the fourth anode via exposes the anode of the fourth light emitting element;

The shape of the boundary of the second anode via includes a plurality of rounded corners, one of the rounded corners is located on a side of the second anode via away from the surrounded first anode via, the rounded corners, away from the first anode via, of four second anode vias surrounding the first anode via form four rounded corners of a rounded corner diamond, and the first anode via passes through the center line of the rounded corner diamond.

In a third aspect, the present disclosure further provides a display apparatus, including the display substrate described above.

In a fourth aspect, the present disclosure further provides a driving method for a pixel circuit, configured to drive the pixel circuit described above. The method includes the following operations.

In a first initialization stage, the first node control sub-circuit provides the signal of the first initial signal terminal to the first node under the control of the first reset signal terminal;

In a data writing stage, the first node control sub-circuit provides the signal of the third node to the first node and the signal of the data signal terminal to the second node under the control of the scanning signal terminal;

In a second initialization stage, the second node control sub-circuit provides the signal of the second initial signal terminal to the fourth node under the control of the second reset signal terminal;

In a light emitting stage, the driving sub-circuit provides driving current to the third node under the control of the first node and the second node, and the light emitting control sub-circuit provides the signal of the first power supply terminal to the second node and the signal of the third node to the fourth node under the control of the light emitting signal terminal.

In some possible implementations, the method further includes: in a second initialization stage, the second node control sub-circuit provides the signal of the second initial signal terminal to the third node under the control of the second reset signal terminal.

Other aspects may be understood upon reading and understanding the drawings and the detailed description.

BRIEF DESCRIPTION OF DRAWINGS

The accompanying drawings are used for providing understanding for technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
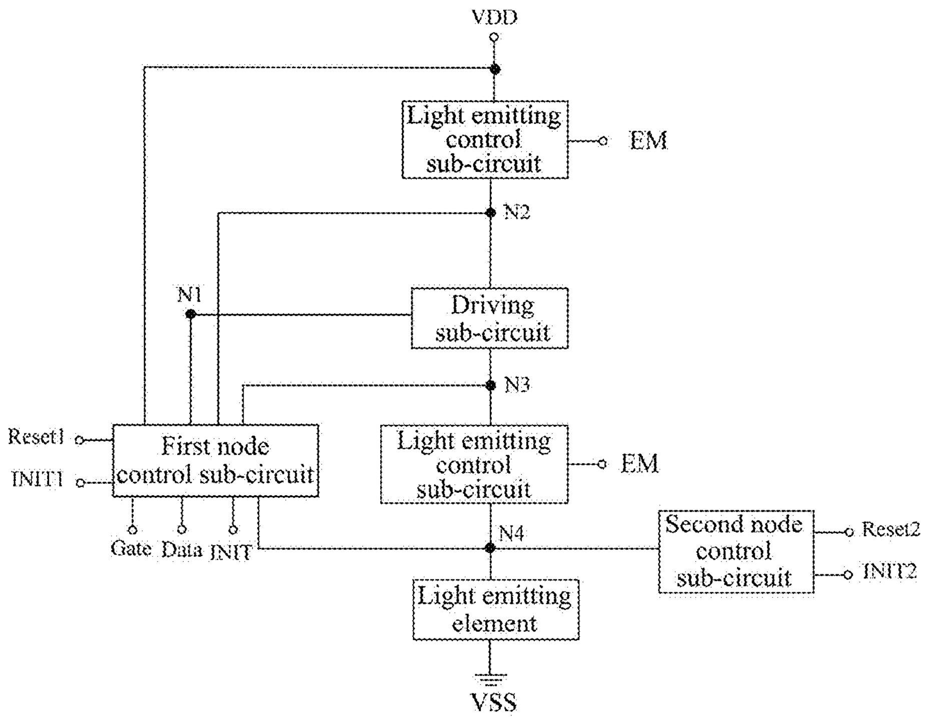
FIG. 1 is a schematic diagram of a structure of a pixel circuit in a display substrate according to an embodiment of the present disclosure.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

In the drawings, a size of each constituent element, a thickness of a layer, or a region is exaggerated sometimes for clarity. Therefore, one implementation mode of the present disclosure is not necessarily limited to the sizes, and shapes and sizes of various components in the drawings do not reflect actual scales. In addition, the drawings schematically illustrate ideal examples, and one implementation of the present disclosure is not limited to the shapes, numerical values, or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, the connection may be a fixed connection, a detachable connection or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the “source electrode” and the “drain electrode” are sometimes interchangeable. Therefore, the “source electrode” and the “drain electrode” are interchangeable in the specification.

In the specification, “electrical connection” includes a case that constituent elements are connected together through an element with a certain electrical effect. The “element with the certain electrical effect” is not particularly limited as long as electrical signals may be sent and received between the connected constituent elements. Examples of the “element with the certain electrical effect” not only include electrodes and wirings, but also include switch elements such as transistors, resistors, inductors, capacitors, other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the specification, a “film” and a “layer” are interchangeable. For example, a “conductive layer” may be replaced with a “conductive film” sometimes. Similarly, an “insulation film” may be replaced with an “insulation layer” sometimes.

In the present disclosure, “about” refers to that a boundary is defined not so strictly and numerical values within process and measurement error ranges are allowed.

A display apparatus includes a pixel circuit that drives a light emitting element to emit light. The display panel of the display apparatus has two driving modes, which are a first driving mode and a second driving mode, the refresh rate (also called display frequency) of the first driving mode is lower than that of the second driving mode. The first driving mode may be called a low-frequency driving mode, and the second driving mode may be called a high-frequency driving mode. In the low-frequency driving mode, a display frame includes a refresh frame (also called a write frame) and at least one hold frame. In this driving mode, the display panel refreshes the display data in the refresh frame and holds the display data refreshed in the refresh frame in the hold frame. When the display apparatus is switched from the high-frequency driving mode to the low-frequency driving mode, especially when displaying in low gray scale, the brightness of the light emitting elements is inconsistent due to the large potential difference between the write frame and the hold frame of some nodes in the pixel circuit, which leads to the flicker problem of the display apparatus and poor display effect.

FIG. 1 is a schematic diagram of a structure of a pixel circuit in a display substrate according to an embodiment of the present disclosure. As shown in FIG. 1, a pixel circuit according to an embodiment of the present disclosure is configured to drive a light emitting element to emit light, and includes a first node control sub-circuit, a second node control sub-circuit, a light emitting control sub-circuit and a driving sub-circuit; the working process of the pixel circuit includes: a first initialization stage, a data writing stage, a second initialization stage and a light emitting stage.

In an exemplary embodiment, the first node control sub-circuit is electrically connected with a first power supply terminal VDD, a first reset signal terminal Reset1, a first initial signal terminal INIT1, a scanning signal terminal Gate, a data signal terminal Data, a first node N1, a second node N2 and a third node N3, respectively, and is configured to provide the signal of the first initial signal terminal INIT1 to the first node N1 under the control of the first reset signal terminal Reset1, to provide the signal of the third node N3 to the first node N1 and the signal of the data signal terminal Data to the second node N2 under the control of the scanning signal terminal Gate; the second node control sub-circuit is electrically connected with the second reset signal terminal Reset2, the second initial signal terminal INIT2 and the fourth node N4 respectively, and is configured to provide the signal of the second initial signal terminal INIT2 to the fourth node N4 under the control of the second reset signal terminal Reset2; the driving sub-circuit is electrically connected with the first node N1, the second node N2 and the third node N3 respectively, and configured to provide a driving current to the third node N3 under the control of the first node N1 and the second node N2; the light emitting control sub-circuit is electrically connected with the light emitting signal terminal EM, the first power supply terminal VDD, the second node N2, the third node N3 and the fourth node N4 respectively, and is configured to provide the signal of the first power supply terminal VDD to the second node N2 and the signal of the third node N3 to the fourth node N4 under the control of the light emitting signal terminal EM.

In this disclosure, the second initialization stage occurs between the data writing stage and the light emitting stage, and the signal of the second reset signal terminal Reset2 is an effective level signal in the second initialization stage.

In this disclosure, in the second initialization stage, the signal of the second reset signal terminal Reset2 and the signal of the light emitting signal terminal EM are mutually inverted signals. That is, when the signal of the second reset signal terminal Reset2 is a high-level signal, the signal of the light emitting signal terminal EM is a low-level signal, and when the signal of the second reset signal terminal Reset2 is a low-level signal, the signal of the light emitting signal terminal EM is a high-level signal.

In an exemplary embodiment, the light emitting element is electrically connected with the fourth node N4 and the second power supply terminal VSS, respectively.

In an exemplary embodiment, the first power supply terminal VDD continuously provides a high-level signal, and the second power supply terminal VSS continuously provides a low-level signal.

In an exemplary embodiment, the pixel circuit includes one first initialization stage, one data writing stage, a plurality of second initialization stages and a plurality of light emitting stages when one frame is displayed. Herein, the write frame can be a time period when the signal of a first light emitting signal terminal EM is an invalid level signal, that is, a data signal will be written in the write frame, and the hold frame can be a time period when the signals of the other light emitting signal terminals EM are invalid level signals, that is, no data signal will be written in the hold frame.

In an exemplary embodiment, when the signal of the light emitting signal terminal EM is an effective level, the second reset signal terminal is at an invalid level, and when the light emitting signal terminal is at an invalid level, the second reset signal terminal is at an effective level.

In an exemplary embodiment, a second initialization stage occurs before each light emitting stage occurs either in a write frame or a hold frame, i.e., the frequency at which the signal of the light emitting signal terminal is an effective level signal is the same as the frequency at which the signal of the second reset signal terminal is an effective level signal.

In an exemplary embodiment, when the signal of the second reset signal terminal Reset2 is an effective level signal, the signal of the light emitting signal terminal EM is an invalid level signal.

In an exemplary embodiment, when the signal of the light emitting signal terminal EM is an effective level signal, the signal of the second reset signal terminal Reset2 is an invalid level signal. When the signal of the light emitting signal terminal EM is an invalid level signal, the signal of the second reset signal terminal Reset2 is an effective level signal in a first time period, wherein the first time period is within the duration when the signal of the light emitting signal terminal EM is an invalid level signal, and the duration of the first time period is less than the duration when the signal of the light emitting signal terminal EM is an invalid level signal.

In an exemplary embodiment, in the first initialization stage, the signal of the first reset signal terminal Reset1 is an effective level signal, and the signals of the second reset signal terminal Reset2, the scanning signal terminal Gate and the light emitting signal terminal EM are invalid level signals.

In an exemplary embodiment, in the data writing stage, the signal of the scanning signal terminal Gate is an effective level signal, and the signals of the first reset signal terminal Reset1, the second reset signal terminal Reset2 and the light emitting signal terminal EM are invalid level signals.

In an exemplary embodiment, in the second initialization stage, the signals of the first reset signal terminal Reset1, the scanning signal terminal Gate and the light emitting signal terminal EM are invalid level signals.

In an illustrative example, in the light emitting stage, the signal of the light emitting signal terminal EM is an effective level signal, and the signals of the first reset signal terminal Reset1, the second reset signal terminal Reset2 and the scanning signal terminal Gate are invalid level signals.

In an exemplary embodiment, the light emitting element may be an Organic light emitting Diode (OLED), including a first electrode (anode), an organic light emitting layer, and a second electrode (cathode) that are stacked.

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary implementation mode, hole injection layers of all sub-pixels may be a common layer connected together, electron injection layers of all the sub-pixels may be a common layer connected together, hole transport layers of all the sub-pixels may be a common layer connected together, electron transport layers of all the sub-pixels may be a common layer connected together, hole block layers of all the sub-pixels may be a common layer connected together, emitting layers of adjacent sub-pixels may be overlapped slightly or may be isolated from each other, and electron block layers of adjacent sub-pixels may be overlapped slightly or may be isolated from each other.

In an exemplary embodiment, the anode of the organic light emitting diode is electrically connected to the fourth node N4, and the cathode of the organic light emitting element is electrically connected to the second power supply terminal VSS.

The pixel circuit according to an embodiment of the present disclosure is configured to drive a light emitting element to emit light, and includes a first node control sub-circuit, a second node control sub-circuit, a light emitting control sub-circuit and a driving sub-circuit; the working process of the pixel circuit includes: a first initialization stage, a data writing stage, a second initialization stage and a light emitting stage; the first node control sub-circuit is electrically connected with a first power supply terminal, a first reset signal terminal, a first initial signal terminal, a scanning signal terminal, a data signal terminal, a first node, a second node and a third node respectively, and is configured to provide the signal of the first initial signal terminal to the first node under the control of the first reset signal terminal, provide the signal of the third node to the first node and the signal of the data signal terminal to the second node under the control of the scanning signal terminal; the second node control sub-circuit is electrically connected with a second reset signal terminal, a second initial signal terminal and a fourth node respectively, and is configured to provide the signal of the second initial signal terminal to the fourth node under the control of the second reset signal terminal; the driving sub-circuit is electrically connected with the first node, the second node and the third node respectively, and is configured to provide a driving current to the third node under the control of the first node and the second node; the light emitting control sub-circuit is electrically connected with a light emitting signal terminal, the first power supply terminal, the second node, the third node and the fourth node respectively, and is configured to provide the signal of the first power supply terminal to the second node and the signal of the third node to the fourth node under the control of the light emitting signal terminal; the light emitting element is electrically connected with the fourth node and the second power supply terminal respectively; the second initialization stage occurs between the data writing stage and the light emitting stage, and the signal of the second reset signal terminal is an effective level signal in the second initialization stage, and the signal of the second reset signal terminal and the signal of the light emitting signal terminal are mutually inverted signals in the second initialization stage. In this disclosure, the fourth node is reset in the second initial stage which occurs between the data writing stage and the light emitting stage, so that the potential consistency of the fourth node in the write frame and the hold frame can be ensured, and the brightness uniformity of the light emitting elements of the display substrate in the write frame and the hold frame can be ensured, and the display effect of the display substrate can be improved.

Figure 2:
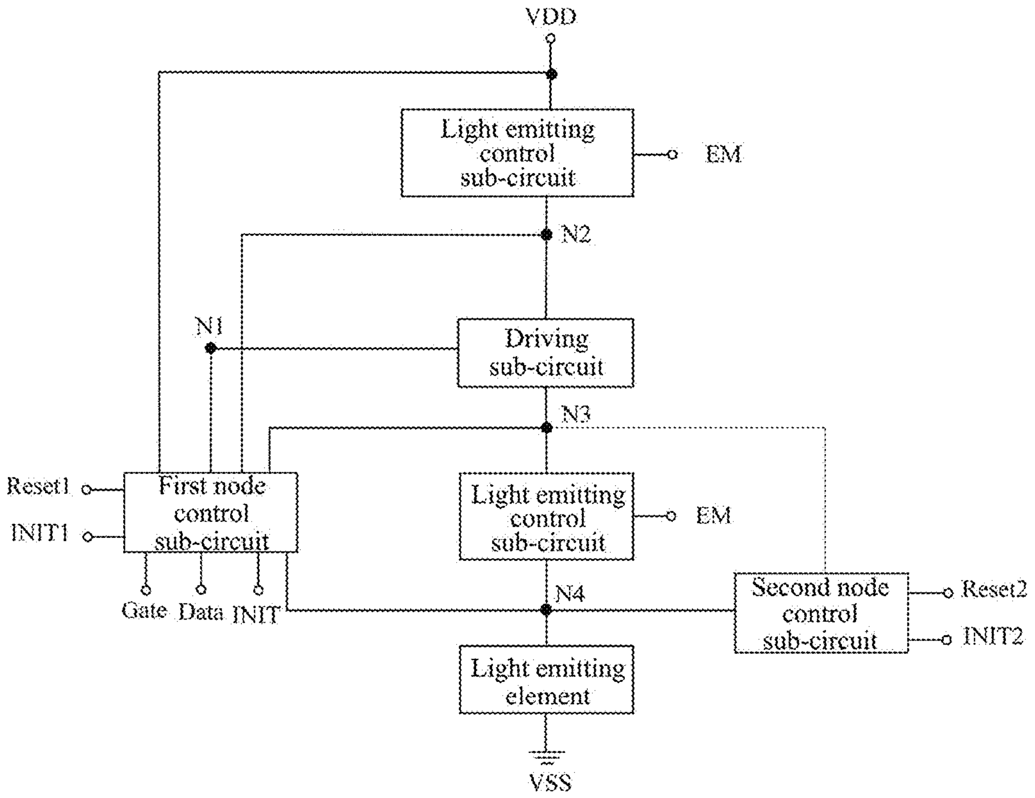
FIG. 2 is a schematic diagram of a structure of a pixel circuit according to an exemplary embodiment.

FIG. 2 is a schematic diagram of a structure of a pixel circuit provided by an exemplary embodiment. As shown in FIG. 2, in an exemplary embodiment, the second node control sub-circuit, which is also electrically connected to the third node N3, is further configured to provide the signal of the second initial signal terminal INIT2 to the third node N3 under the control of the second reset signal terminal Reset2. In this disclosure, the third node is reset in the second initial stage between the data writing stage and the light emitting stage, so that the potential consistency of the third node in the write frame and the hold frame can be ensured, and the brightness uniformity of the light emitting elements of the display substrate in the write frame and the hold frame can be ensured, and the display effect of the display substrate can be improved.

Figure 3:
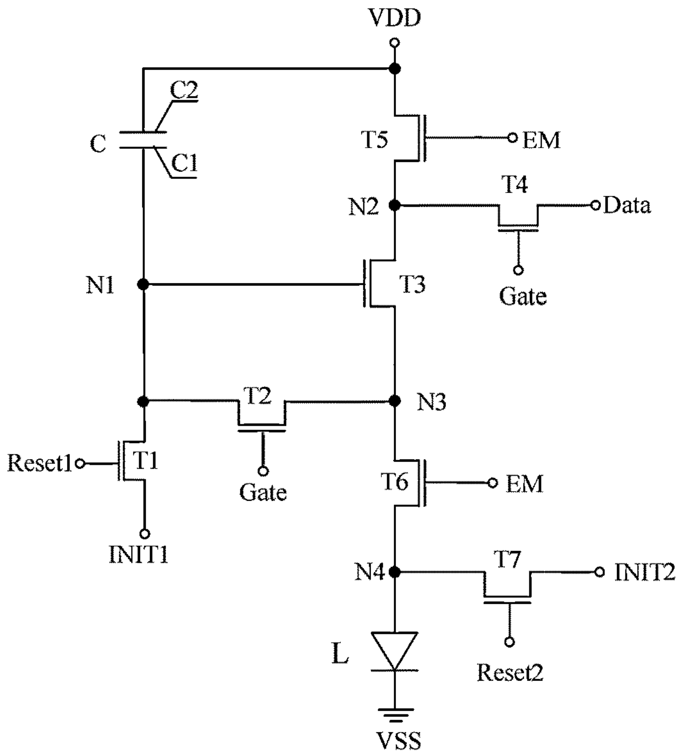
FIG. 3 is a diagram of an equivalent circuit of a pixel circuit provided by an exemplary embodiment.
Figure 4:
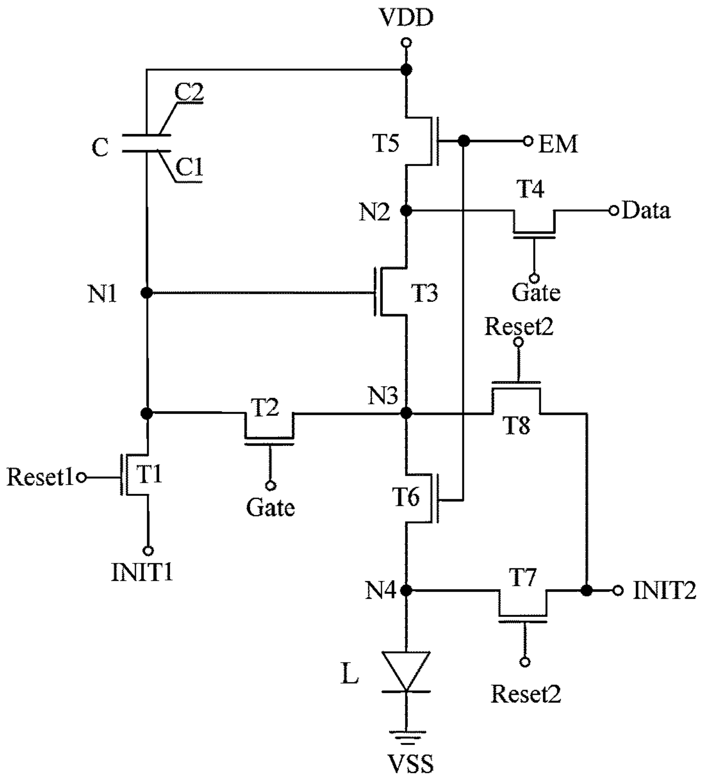
FIG. 4 is an equivalent circuit diagram of a pixel circuit according to another exemplary embodiment.

FIG. 3 is an equivalent circuit diagram of a pixel circuit according to an exemplary embodiment, and FIG. 4 is an equivalent circuit diagram of a pixel circuit according to another exemplary embodiment. As shown in FIGS. 3 and 4, in an exemplary embodiment, the first node control sub-circuit may include a first transistor T1, a second transistor T2, a fourth transistor T4 and a capacitor C, and the capacitor C includes a first plate C1 and a second plate C2. Herein, a control electrode of the first transistor T1 is electrically connected with the first reset signal terminal Reset1, a first electrode of the first transistor T1 is electrically connected with the first initial signal terminal INIT1, and a second electrode of the first transistor T1 is electrically connected with the first node N1; a control electrode of the second transistor T2 is electrically connected with the scanning signal terminal Gate, a first electrode of the second transistor T2 is electrically connected with the first node N1, and a second electrode of the second transistor T2 is electrically connected with the third node N3; a control electrode of the fourth transistor T4 is electrically connected with the scanning signal terminal Gate, a first electrode of the fourth transistor T4 is electrically connected with the data signal terminal Data, a second electrode of the fourth transistor T4 is electrically connected with the second node N2, the first plate C1 of the capacitor C is electrically connected with the first node N1, and the second plate C2 of the capacitor C is electrically connected with the first power supply terminal VDD.

In an exemplary embodiment, the first node control sub-circuit may include two first transistors connected in series, which can reduce the leakage current of the pixel circuit, avoid the abnormality of the pixel circuit caused by the failure of one of the first transistors, and improve the reliability of the pixel circuit. The first node control sub-circuit may alternatively include one first transistor, as long as the function of the first node control sub-circuit can be achieved.

In an exemplary embodiment, the first node control sub-circuit may include two second transistors connected in series, which can reduce the leakage current of the pixel circuit, avoid the abnormality of the pixel circuit caused by the failure of one of the second transistors, and improve the reliability of the pixel circuit. The first node control sub-circuit may alternatively include one second transistor, as long as the function of the first node control sub-circuit can be achieved.

In an exemplary embodiment, as shown in FIGS. 3 and 4, the driving sub-circuit may include a third transistor T3. Herein, a control electrode of the third transistor T3 is electrically connected to the first node N1, a first electrode of the third transistor T3 is electrically connected to the second node N2, and a second electrode of the third transistor T3 is electrically connected to the third node N3.

The third transistor T3 may be referred to as a driving transistor. The third transistor T3 determines a driving current flowing between the first power terminal VDD and the second power terminal VSS according to a potential difference between its control electrode and first electrode.

In an exemplary embodiment, as shown in FIGS. 3 and 4, the light emitting control sub-circuit may include a fifth transistor T5 and a sixth transistor T6. A control electrode of the fifth transistor T5 is electrically connected with the light emitting signal terminal EM, a first electrode of the fifth transistor T5 is electrically connected with the first power supply terminal VDD, and a second electrode of the fifth transistor T5 is electrically connected with the second node N2. A control electrode of the sixth transistor T6 is electrically connected to the light emitting signal terminal EM, a first electrode of the sixth transistor T6 is electrically connected to the third node N3, and a second electrode of the sixth transistor T6 is electrically connected to the fourth node N4.

The fifth transistor T5 and the sixth transistor T6 may be referred to as light emitting transistors. When the signal of the light emitting signal terminal EM is an effective level signal, the fifth transistor T5 and the sixth transistor T6 enable a light emitting element to emit light by forming a path of drive current between the first power supply line VDD and the second power supply line VSS.

An exemplary structure of the first node control sub-circuit, the light emitting control sub-circuit and the driving sub-circuit is shown in FIGS. 3 and 4. Those skills in that art can easily understand that the implementation of the first node control sub-circuit, the light emitting control sub-circuit and the driving sub-circuit is not limit to this.

In an exemplary embodiment, as shown in FIG. 3, the second node control sub-circuit may include a seventh transistor T7. A control electrode of the seventh transistor T7 is electrically connected to the second reset signal terminal Reset2, a first electrode of the seventh transistor T7 is electrically connected to the second initial signal terminal INIT2, and a second electrode of the seventh transistor T7 is electrically connected to the fourth node N4.

In an exemplary embodiment, as shown in FIG. 4, the second node control sub-circuit may include a seventh transistor T7 and an eighth transistor T8. A control electrode of the seventh transistor T7 is electrically connected to the second reset signal terminal Reset2, a first electrode of the seventh transistor T7 is electrically connected to the second initial signal terminal INIT2, and a second electrode of the seventh transistor T7 is electrically connected to the fourth node N4. A control electrode of the eighth transistor T8 is electrically connected to the second reset signal terminal Reset2, a first electrode of the eighth transistor T8 is electrically connected to the second initial signal terminal INIT2, and a second electrode of the eighth transistor T8 is electrically connected to the third node N3.

In an exemplary embodiment, as shown in FIG. 3, the first transistor T1 to seventh transistor T7 may be P-type transistors or may be N-type transistors. The transistor types of the first transistor T1 to the seventh transistor T7 are the same. Using the same type of transistors in the pixel circuit can simplify the process flow, reduce the process difficulty of the display panel, and improve the yield of products.

In an exemplary embodiment, the first transistor T1 to seventh transistor T7 may include P-type transistors and N-type transistors.

In an exemplary embodiment, the first transistor T1 to seventh transistor T7 may be low-temperature polysilicon transistors.

In an exemplary embodiment, some of the first transistor T1 to seventh transistor T7 may be oxide transistors and some of the transistors may be low-temperature polysilicon transistors. The oxide transistor can reduce the leakage current, improve the performance of the pixel circuit and reduce the power consumption of the pixel circuit.

In an exemplary embodiment, as shown in FIG. 4, the first transistor T1 to eighth transistor T8 may be P-type transistors or may be N-type transistors. The transistor types of the first transistor T1 to the eighth transistor T8 are the same, and using the same type of transistors in the pixel circuit can simplify the process flow, reduce the process difficulty of the display substrate, and improve the yield of products.

In an exemplary embodiment, the first transistor T1 to eighth transistor T8 may include P-type transistors and N-type transistors.

In an exemplary embodiment, the first transistor T1 to eighth transistor T8 may be low-temperature polysilicon transistors.

In an exemplary embodiment, some transistors of the first transistor T1 to eighth transistor T8 may be oxide transistors, and some of the transistors may be low-temperature polysilicon transistors. The oxide transistor can reduce the leakage current, improve the performance of the pixel circuit and reduce the power consumption of the pixel circuit.

Hereinafter, an exemplary embodiment of the present disclosure will be explained through the working process of the pixel circuit illustrated in FIG. 3.

Figure 5:
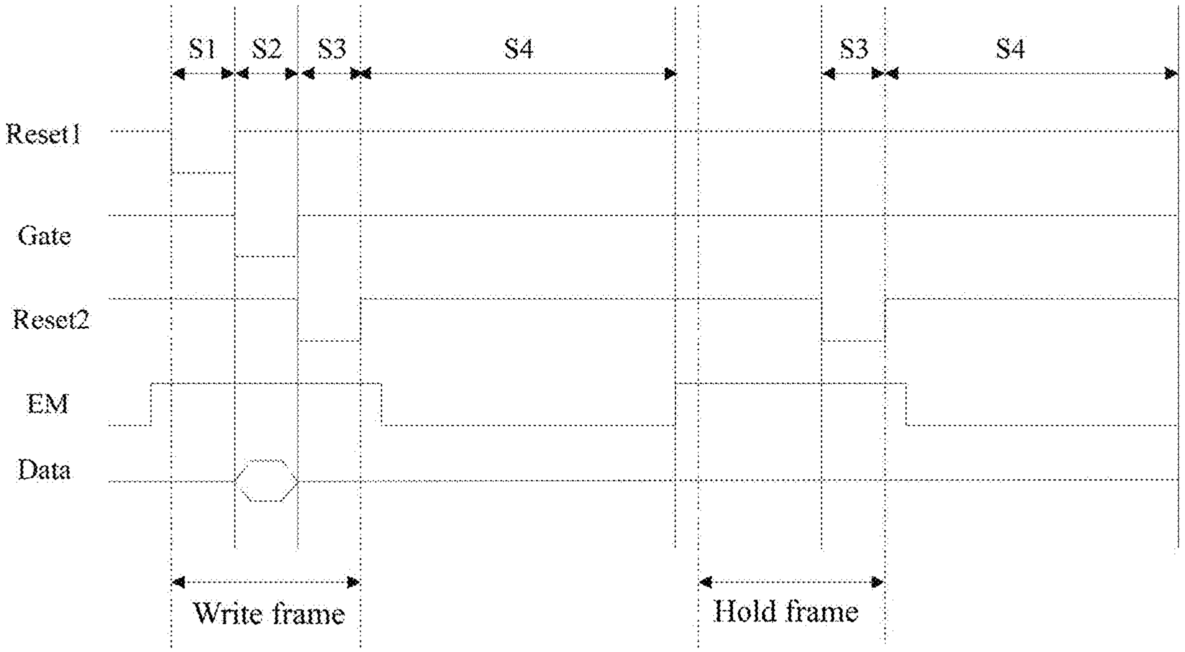
FIG. 5 is a working timing diagram of a pixel circuit.

FIG. 5 is a working timing diagram of a pixel circuit, which is illustrated by taking the first transistor T1 to the seventh transistor T7 as P-type transistor as an example. The pixel circuit in FIG. 3 includes a first transistor T1 to a seventh transistor T7, a capacitor C, and nine signal terminals (a data signal terminal Data, a scanning signal terminal Gate, a first reset signal terminal Reset1, a second reset signal terminal Reset2, a light emitting signal terminal EM, a first initial signal terminal INIT1, a second initial signal terminal INIT2, a first power supply terminal VDD and a second power supply terminal VSS). The working process of the pixel circuit in FIG. 3 may include the following stages.

In a first stage S1, referred to as a first initialization stage, the first reset signal terminal Reset1 is a low-level signal, and the signals of the scanning signal terminal Gate, the second reset signal terminal Reset2 and the light emitting signal terminal EM are all high-level signals. The signal of the first reset signal terminal Reset1 is a low-level signal, the first transistor T1 is turned on, and the signal of the first initial signal terminal INIT1 is provided to the first node N1, so that the first node N1 is initialized (reset) and the pre-stored voltage inside the first node N1 is cleared to complete initialization. The signals of the scanning signal terminal Gate, the second reset signal terminal Reset2 and the light emitting signal terminal EM are all high-level signals, and the second transistor T2, the fourth transistor T4, the fifth transistor T5, the sixth transistor T6 and the seventh transistor T7 are turned off. In this stage, the light emitting element L does not emit light.

In a second stage S2, referred to as a data writing stage or threshold compensation stage, the signal of the scanning signal terminal Gate is a low-level signal, the signals of the first reset signal terminal Reset1, the second reset signal terminal Reset2 and the light emitting signal terminal EM are high-level signals, and the data signal terminal Data outputs a data voltage. In this stage, because the signal of the first node N1 is a low-level signal, the third transistor T3 is turned on. The signal of the scan signal terminal Gate is a low-level signal, and the second transistor T2 and the fourth transistor T4 are turned on. The second transistor T2 and the fourth transistor T4 cause the data voltage output by the data signal terminal Data to be provided to the first node N1 through the second node N2, the turned-on third transistor T3, the third node N3 and the turned-on second transistor T2, and charge the difference between the data voltage output by the data signal terminal Data and the threshold voltage of the third transistor T3 into the capacitor C until the voltage of the first node N1 is $Vd-|Vth|$, where Vd is the data voltage output by the data signal terminal Data and Vth is the threshold voltage of the third transistor T3. The signals of the first reset signal terminal Reset1, the second reset signal terminal Reset2 and the light emitting signal terminal EM are high-level signals, and the first transistor T1, the fifth transistor T5, the sixth transistor T6 and the seventh transistor T7 are turned off. The light emitting element L does not emit light in this stage.

In a third stage S3, referred to as a second initialization stage, the second reset signal terminal Reset2 is a low-level signal, and the signals of the scanning signal terminal Gate, the first reset signal terminal Reset1 and the light emitting signal terminal EM are all high-level signals. The signal of the second reset signal terminal Reset2 is a low-level signal, the seventh transistor T7 is turned on, and the signal of the second initial signal terminal INIT2 is provided to the fourth node N4, so that the first electrode of the light emitting element is initialized (reset), and the pre-stored voltage inside the fourth node N4 is cleared to complete initialization. The signals of the scanning signal terminal Gate, the first reset signal terminal Reset1 and the light emitting signal terminal EM are all high-level signals, and the first transistor t1, the second transistor T2, the fourth transistor T4 and the fifth transistor T5 are turned off. In this stage, the light emitting element L does not emit light.

In a fourth stage S4, referred to as a light emitting stage, the signal of the light emitting signal terminal EM is a low-level signal, and the signals of the first reset signal terminal Reset1, the second reset signal terminal Reset2 and the scanning signal terminal Gate are high-level signals. The signals of the first reset signal terminal Reset1, the second reset signal terminal Reset2 and the scanning signal terminal Gate are high-level signals, and the first transistor T1, the second transistor T2, the fourth transistor T4 and the seventh transistor T7 are turned off. The signals of the light emitting signal terminal EM are low-level signals, the fifth transistor T5 and the sixth transistor T6 are turned on, and a power supply voltage outputted by the first power terminal VDD provides a driving voltage to the first electrode of the light emitting element L through the fifth transistor T5, third transistor T3 and sixth transistor T6, which are all turned on, to drive the light emitting element L to emit light.

In a drive process of the pixel circuit, a drive current flowing through the third transistor T3 (drive transistor) is determined by a voltage difference between a control electrode and a first electrode of the third transistor T3. Because the voltage of the first node N1 is Vd−|Vth|, the drive current of the third transistor T3 is as follows:

$$I=K^*(Vgs-Vth)^2=K^*[(Vdd-Vd+|Vth|)-Vth]^2=K^*[(Vdd-Vd)]^2$$

Among them, I is the drive current flowing through the third transistor T3, that is, the drive current for driving an OLED, K is a constant, Vgs is the voltage difference between the control electrode and the first electrode of the third transistor T3, Vth is the threshold voltage of the third transistor T3, Vd is the data voltage output by the data signal terminal Data, and Vdd is the power supply voltage output by the first power supply terminal VDD.

The pixel circuit provided in FIG. 3 sets the initialization of the fourth node after the data writing stage, and ensures that the potential of the fourth node is initialized before the light emitting stage, so that the potential of the fourth node of the pixel circuit in the write frame and the hold frame is consistent, the jump in the potential of the fourth node is reduced, the display uniformity of the write frame and the hold frame is ensured, the flicker problem of the display substrate is improved, and the display effect of the display substrate is enhanced.

The working timing of the pixel circuit provided in FIG. 4 is as shown in FIG. 5. The working process of the pixel circuit provided in FIG. 4 is different from that of the pixel circuit provided in FIG. 3 in that in the pixel circuit provided in FIG. 4, in the second initialization stage, the eighth transistor T8 is turned on, and the signal of the second initial signal terminal INIT2 is provided to the third node N3, the third node N3 is initialized (reset), and the pre-stored voltage inside the third node N3 is cleared to complete the initialization. That is, in the second initialization stage of FIG. 4, both the third node N3 and the fourth node N4 are initialized.

The pixel circuit provided in FIG. 4 sets the initialization of the third node and the fourth node after the data writing stage, and ensures that the potentials of the third node and the fourth node are initialized before the light emitting stage, so that the potentials of the third node and the fourth node of the pixel circuit are consistent in the write frame and the hold frame, which reduces the jump of the potentials of the third node and the fourth node, ensures the display uniformity of the write frame and the hold frame, improves the flicker problem of the display substrate, and improves the display effect of the display substrate.

After testing, the pixel circuit provided in FIG. 4 is more effective in improving the flicker problem of the display substrate than that of the pixel circuit provided in FIG. 3.

The embodiment of the present disclosure further provides a display substrate, which includes a base substrate, and a circuit structure layer and a light emitting structure layer sequentially arranged on the base substrate, wherein the light emitting structure layer includes a light emitting element, and the circuit structure layer includes pixel circuits arranged in an array and configured to drive the light emitting element to emit light.

Among them, the pixel circuit is the pixel circuit according to any one of the foregoing embodiments, and the implementation principle and implementation effects are similar, which will not be repeated here.

In an exemplary embodiment, the display substrate may be a low temperature polycrystalline oxide (LTPO) display substrate or a low temperature poly-silicon (LTPS) display substrate.

In an exemplary embodiment, the substrate may be a rigid substrate or a flexible substrate, wherein the rigid substrate may be, but is not limited to, one or more of glass and conductive foil; the flexible substrate may be, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary embodiment, the light emitting structure layer includes an anode layer, a pixel definition layer, an organic structure layer and a cathode layer which are sequentially stacked on the base substrate; the anode layer includes an anode, the organic structure layer includes an organic light emitting layer, and the cathode layer includes a cathode.

In an exemplary embodiment, the light emitting element includes a first light emitting element, a second light emitting element, a third light emitting element and a fourth light emitting element, the first light emitting element emits red light, the second light emitting element emits blue light, and the third light emitting element and the fourth light emitting element emit green light; the area of the anode of the second light emitting element is larger than that of the anode of the first light emitting element, and the anode of the third light emitting element and the anode of the fourth light emitting element are symmetrical about a virtual straight line extending in the first direction.

In an exemplary embodiment, a virtual straight line extending in the first direction passes through the anode of the first light emitting element and the anode of the second light emitting element, a virtual straight line extending in the second direction passes through the anode of the first light emitting element and the anode of the second light emitting element, and a virtual straight line extending in the first direction passes through the anode of the third light emitting element and the anode of the fourth light emitting element; a virtual straight line extending in the second direction passes through the anode of the third light emitting element and the anode of the fourth light emitting element, and anodes of four second light emitting elements, anodes of two third light emitting elements and anodes of two fourth light emitting elements are disposed around the anode of the first light emitting element.

In an exemplary embodiment, the shape of the boundary of the anode of at least one second light emitting element includes at least one rounded corner.

In an exemplary embodiment, the pixel definition layer includes a first anode via to a fourth anode via, the first anode via exposes the anode of the first light emitting element, the second anode via exposes the anode of the second light emitting element, the third anode via exposes the anode of the third light emitting element, and the fourth anode via exposes the anode of the fourth light emitting element;

In an exemplary embodiment, the shape of the boundary of the second anode via includes a plurality of rounded corners, one of the rounded corners is located on the side of the second anode via away from the surrounded first anode via, the rounded corners, away from the first anode via, of four second anode vias surrounding the first anode via form four rounded corners of a rounded corner diamond, and the first anode via passes through the center line of the rounded corner diamond.

In an exemplary embodiment, the display substrate may further include a plurality of first reset signal lines, a plurality of second reset signal lines, a plurality of scanning signal lines, a plurality of light emitting signal lines, a plurality of first initial signal lines and a plurality of second initial signal lines extending in a first direction and arranged in a second direction, and a plurality of first power supply lines and a plurality of data signal lines extending in the second direction and arranged in the first direction; the first direction and the second direction intersect.

In an exemplary embodiment, the first reset signal terminal of the pixel circuit is electrically connected with the first reset signal line, the second reset signal terminal is electrically connected with the second reset signal line, the scanning signal terminal is electrically connected with the scanning signal line, the light emitting signal terminal is electrically connected with the light emitting signal line, the first initial signal terminal is electrically connected with the first initial signal line, the second initial signal terminal is electrically connected with the second initial signal line, the first power supply terminal is electrically connected with the first power supply line, and the data signal terminal is electrically connected with the data signal line.

In an exemplary embodiment, when the pixel circuit is the pixel circuit provided in FIG. 4, the circuit structure layer may include a semiconductor layer, a first insulating layer, a first conductive layer, a second insulating layer, a second conductive layer, a third insulating layer, a third conductive layer, a planarization layer and a fourth conductive layer which are sequentially stacked on the base substrate.

In an exemplary embodiment, the semiconductor layer may include an active layer of the first transistor to an active layer of the eighth transistor located in at least one pixel circuit.

In an exemplary embodiment, the first conductive layer may include a first reset signal line, a second reset signal line, a scanning signal line, a light emitting signal line, and a first plate of a capacitor located in at least one pixel circuit and a control electrode of a first transistor to a control electrode of a eighth transistor.

In an exemplary embodiment, the second conductive layer may include a first initial signal line, a second initial signal line, and a second plate of a capacitor located in at least one pixel circuit, wherein the second plates of capacitors of adjacent pixel circuits located in a same row are electrically connected;

In an exemplary embodiment, the third conductive layer may include a first electrode and a second electrode of the first transistor, a first electrode of the second transistor, a first electrode of the fourth transistor, a first electrode of the fifth transistor, a second electrode of the sixth transistor, a first electrode and a second electrode of the seventh transistor, and a first electrode and a second electrode of the eighth transistor . . . .

In an exemplary embodiment, the fourth conductive layer may include a first power supply line and a data signal line.

In an exemplary embodiment, an active layer of a transistor includes a channel region, and a first electrode connection part and a second electrode connection part respectively located at two sides of the channel region. Herein, the first electrode connection part of the active layer of the third transistor is multiplexed as the first electrode of the third transistor, the second electrode of the fourth transistor and the second electrode of the fifth transistor; the second electrode connection part of the active layer of the third transistor is multiplexed as the second electrode of the second transistor, the second electrode of the third transistor and the first electrode of the sixth transistor.

In an exemplary embodiment, the first reset signal line and the scanning signal line connected to the pixel circuit are located on a same side of the first plate of the capacitor of the pixel circuit, and the first reset signal line is located on the side of the scanning signal line away from the first plate of the capacitor of the pixel circuit.

In an exemplary embodiment, the light emitting signal line and the second reset signal line connected to the pixel circuit are located on the side of the first plate of the capacitor of the pixel circuit away from the scanning signal line, and the second reset signal line is located on the side of the light emitting signal line away from the first plate of the capacitor of the pixel circuit.

In an exemplary embodiment, the first initial signal line and the second initial signal line connected to the pixel circuit are respectively located on opposite sides of the second plate of the capacitor of the pixel circuit, and the second initial signal line connected to the pixel circuit in row i−1 is located between the first initial signal line connected to the pixel circuit in row i and the second plate of the capacitor of the pixel circuit in row i.

In an exemplary embodiment, the orthographic projection of the first reset signal line connected to the pixel circuit in row i on the base substrate is located between the orthographic projection of the first initial signal line connected to the pixel circuit in row i on the base substrate and the orthographic projection of the second initial signal line connected to the pixel circuit in row i−1 on the base substrate.

In an exemplary embodiment, the orthographic projection of the scanning signal line connected to the pixel circuit in row i on the base substrate is located between the orthographic projection of the second initial signal line connected to the pixel circuit in row i−1 on the base substrate and the orthographic projection of the second plate of the capacitor of the pixel circuit in row i on the base substrate.

In an exemplary embodiment, the first initial signal line includes a plurality of first initial body parts and a plurality of first initial connection parts disposed at intervals and arranged in the first direction, and the first initial connection part is configured to connect two adjacent first initial body parts.

In an exemplary embodiment, the length of the first initial body part in the second direction is greater than the length of the first initial connection part in the second direction.

In an exemplary embodiment, the orthographic projection of the first initial body part on the base substrate partially overlaps the orthographic projection of the active layer of the first transistor on the base substrate, and there is no overlapping area between the orthographic projection of the first initial connection part on the base substrate and the orthographic projection of the active layer of the first transistor on the base substrate.

In an exemplary embodiment, the second initial signal line includes a second initial body part extending in a first direction, a first connection part located on a first side of the second initial body part, and a second connection part and a third connection part located on a second side of the second initial body part, wherein the first side and the second side are oppositely arranged, and the first side of the i−1th second initial signal line is a side close to the i−1th first initial signal line.

In an exemplary embodiment, the first connection part extends in the second direction, and has an orthographic projection on the base substrate that at least partially overlaps the orthographic projection of the active layer of the first transistor on the base substrate;

In an exemplary embodiment, the second connection part extends in the second direction, and has an orthographic projection on the base substrate that at least partially overlaps the orthographic projection of the active layer of the second transistor on the base substrate;

In an exemplary embodiment, the third connection part extends in the second direction, and has an orthographic projection on the base substrate that does not overlap the orthogonal projections of the active layer of the first transistor and the active layer of the second transistor on the base substrate.

In an exemplary embodiment, the orthographic projection of the third connection part of the second initial signal line on the base substrate is located between the orthographic projection of the first electrode of the second transistor and the orthographic projection of the data signal line on the base substrate.

In an exemplary embodiment, the first insulating layer, the second insulating layer and the third insulating layer are provided with first via to eighth via, the third via exposes the second electrode connection part of the active layer of the third transistor, the fourth via exposes the active layer of the fourth transistor, and the eighth via exposes the active layer of the eighth transistor.

In an exemplary embodiment, the second electrode of the eighth transistor includes an electrode body part and an electrode extension part which are connected with each other, wherein the electrode body part extends in the second direction, and the included angle between the electrode body part and the electrode extension part is greater than or equal to 90 degrees, or less than 180 degrees.

In an exemplary embodiment, the electrode body part is electrically connected with the active layer of the eighth transistor through the eighth via, and has an orthographic projection on the base substrate that partially overlaps the orthographic projections of the light emitting signal line connected to the pixel circuit and the second plate of the capacitor on the base substrate.

In an exemplary embodiment, the electrode extension part is electrically connected with the second electrode connection part of the active layer of the third transistor through the third via.

In an exemplary embodiment, an adjacent pixel circuit located in a same row with the pixel circuit include a first adjacent pixel circuit and a second adjacent pixel circuit, the first adjacent pixel circuit is located on the side of the first power supply line connected to the pixel circuit away from the data signal line, and the second adjacent pixel circuit is located on the side of the data signal line connected to the pixel circuit away from the first power supply line.

In an exemplary embodiment, a virtual straight line extending in the second direction passes through the active layer of the eighth transistor of the pixel circuit and the fourth via of the first adjacent pixel circuit respectively.

In an exemplary embodiment, a virtual straight line extending in the second direction passes through the electrode body part of the pixel circuit and the fourth via of the first adjacent pixel circuit respectively.

The present disclosure can ensure the reliability of the display substrate using an alignment process by means of a virtual straight line extending in the second direction that passes through the active layer of the eighth transistor of the pixel circuit and the fourth via of the first adjacent pixel circuit respectively and a virtual straight line extending in the second direction that passes through the electrode body part of the pixel circuit and the fourth via of the first adjacent pixel circuit respectively.

In an exemplary embodiment, the orthographic projection of the first power supply line connected to the pixel circuit on the base substrate is located between the orthographic projection of the data signal line connected to the pixel circuit on the base substrate and the orthographic projection of the second electrode of the first transistor of the pixel circuit on the base substrate.

In an exemplary embodiment, the orthographic projection of the first power supply line on the base substrate at least partially overlaps the orthographic projection of the third connection part of the second initial signal line on the base substrate.

In an exemplary embodiment, the orthographic projection of the data signal line on the base substrate at least partially overlaps the orthographic projection of the electrode body part of the first adjacent pixel circuit of the pixel circuit connected to the data signal line. The electrode body part of the first adjacent pixel circuit in the present disclosure may level up the data signal line of the pixel circuit.

The structure of the display substrate will be described below through an example of a manufacturing process for the display substrate. A "patterning process" mentioned in the present disclosure includes processes such as film deposition, photoresist coating, mask exposure, development, etching, and photoresist stripping. Deposition may be any one or more of sputtering, evaporation, and chemical vapor deposition. Coating may be any one or more of spray coating and spin coating. Etching may be any one or more of dry etching and wet etching. A "thin film" refers to a layer of a thin film prepared from a material on a base substrate using a process of deposition or coating. If no patterning process is needed for the "thin film" in the whole making process, the "thin film" may also be called a "layer". If the patterning process is needed for the "thin film" in the whole making process, the thin film is called a "thin film" before the patterning process and called a "layer" after the patterning process. The "layer" after the patterning process includes at least one "pattern". "A and B are arranged in the same layer" in the present disclosure refers to that A and B are simultaneously formed by the same patterning process.

FIG. 6 to FIG. 14B are schematic diagrams of a preparation process for a display substrate according to an exemplary embodiment. FIGS. 6 to 14B illustrate pixel circuits with one row and two columns as an example. As shown in FIG. 6 to FIG. 14B, the preparation process of the display substrate according to the exemplary embodiment may include following contents.

Figure 6:
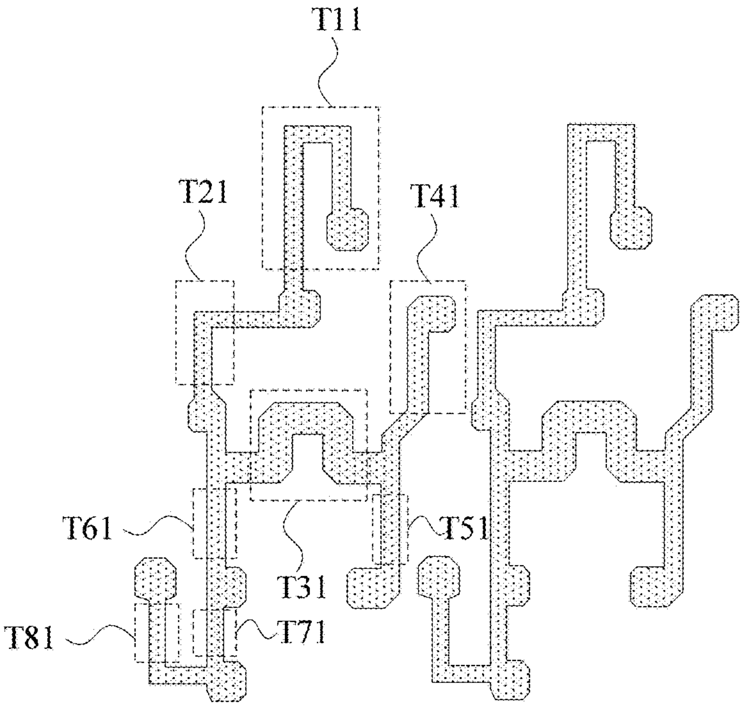
FIG. 6 is a schematic diagram after a semiconductor layer pattern is formed.

(1) Forming a semiconductor layer pattern on a base substrate, which includes depositing a semiconductor film on the base substrate, and patterning the semiconductor film using a patterning process to form the semiconductor layer pattern, as shown in FIG. 6, which is a schematic diagram after a semiconductor layer pattern is formed.

In an exemplary embodiment, as shown in FIG. 6, the semiconductor layer includes an active layer T11 of a first transistor, an active layer T21 of a second transistor, an active layer T31 of a third transistor, an active layer T41 of a fourth transistor, an active layer T51 of a fifth transistor, an active layer T61 of a sixth transistor, an active layer T71 of a seventh transistor and an active layer T81 of an eighth transistor located in at least one pixel circuit.

In an exemplary embodiment, the active layer T11 of the first transistor to the active layer T81 of the eighth transistor may be an integrally formed structure.

In an exemplary embodiment, the sides of the active layer of the third transistor include a first side, a second side and a third side, wherein the first side and the second side are oppositely arranged. Among them, the active layer T21 of the second transistor, the active layer T61 of the sixth transistor to the active layer T81 of the eighth transistor are located on the first side of the active layer T31 of the third transistor, the active layer T41 of the fourth transistor and the active layer T51 of the fifth transistor are located on the second side of the active layer T31 of the third transistor, and the active layer T11 of the first transistor is located on the third side of the active layer T31 of the third transistor . . . .

In an exemplary embodiment, the active layer T81 of the eighth transistor is located on the side of the active layer T71 of the seventh transistor away from the active layer T31 of the third transistor.

Figure 7A:
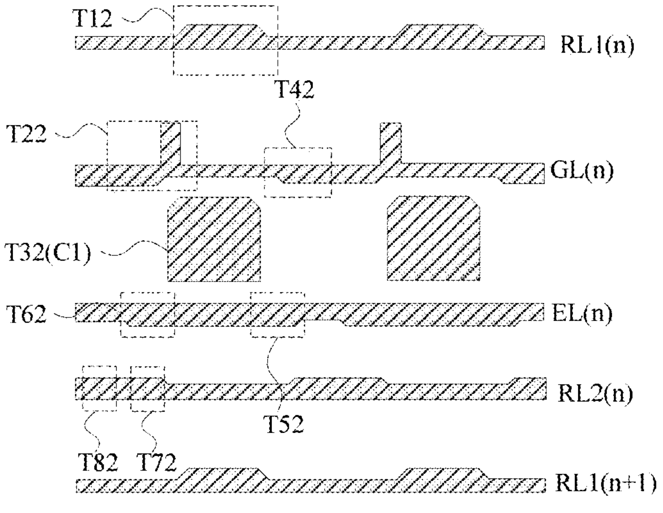
FIG. 7A is a schematic diagram of a first conductive layer pattern.
Figure 7B:
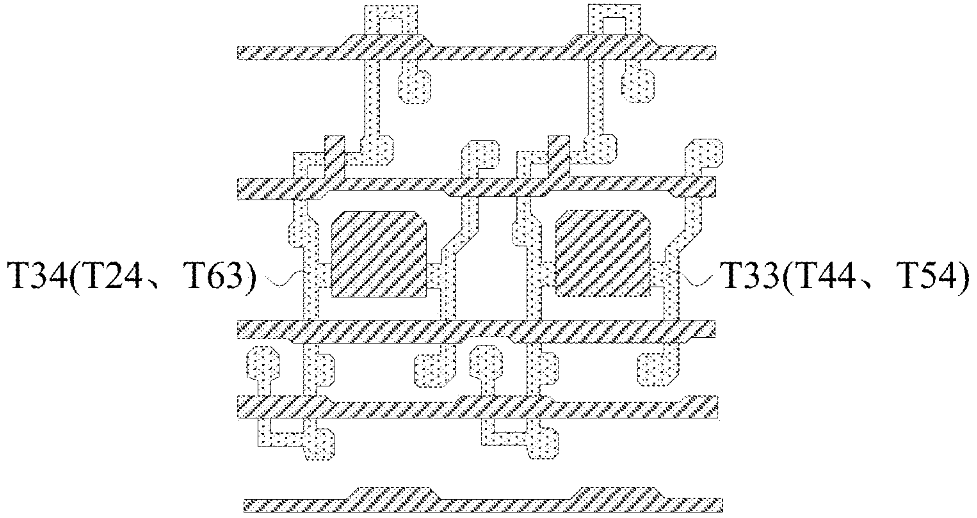
FIG. 7B is a schematic diagram after a first conductive layer pattern is formed.

(2) Forming a first conductive layer pattern, which includes depositing a first insulating film and a first conductive film sequentially on the base substrate on which the aforementioned patterns are formed, and patterning the first insulating film and the first conductive film using a patterning process to form the first insulating layer pattern and the first conductive layer pattern on the first insulating layer, as shown in FIGS. 7A and 7B, wherein FIG. 7A is a schematic diagram of a first conductive layer pattern and FIG. 7B is a schematic diagram after a first conductive layer pattern is formed.

In an exemplary embodiment, as shown in FIG. 7A, the first conductive layer may include: a plurality of first reset signal lines RL1, a plurality of second reset signal lines RL2, a plurality of scanning signal lines GL, a plurality of light emitting signal lines EL extending in a first direction and arranged in a second direction, and a first electrode C1 of a capacitor, a gate electrode T12 of a first transistor, a gate electrode T22 of a second transistor, a gate electrode T32 of a third transistor, a gate electrode T42 of a fourth transistor, a gate electrode T52 of a fifth transistor, a gate electrode T62 of a sixth transistor, a gate electrode T72 of a seventh transistor, and a gate electrode T82 of an eighth transistor located in at least one pixel circuit. In FIG. 7A, RL1(*i*) is the ith first reset signal line, RL2(*i*) is the ith second reset signal line, GL(i) is the ith scanning signal line, and EL(i) is the ith light emitting signal line.

In an exemplary embodiment, as shown in FIGS. 7A and 7B, the first reset signal line RL1 and the scanning signal line GL connected to the pixel circuit are located on the same side of the first plate C1 of the pixel circuit, and the first reset signal line RL1 is located on the side of the scanning signal line GL away from the first plate C1 of the pixel circuit. The light emitting signal line EL and the second reset signal line RL2 connected to the pixel circuit are located on the side of the first plate C1 of the pixel circuit away from the scanning signal line GL, and the second reset signal line RL2 is located on the side of the light emitting signal line EL away from the first plate C1 of the pixel circuit.

In an exemplary embodiment, as shown in FIGS. 7A and 7B, for the pixel circuit, the gate electrode T12 of the first transistor and the first reset signal line RL1 connected to the pixel circuit are integrally formed, the gate electrode T22 of the second transistor and the gate electrode T42 of the fourth transistor are integrally formed with the scanning signal line GL connected to the pixel circuit, the gate electrode T32 of the third transistor and the first plate C1 of the capacitor are integrally formed, and the gate electrode T52 of the fifth transistor and the gate electrode T62 of the sixth transistor are integrally formed with the light emitting signal line EL connected to the pixel circuit. The gate electrode T72 of the seventh transistor and the gate electrode T82 of the eighth transistor are integrally formed with the second reset signal line RL2 connected to the pixel circuit.

In an exemplary embodiment, the gate electrode T12 of the first transistor is disposed across the active layer of the first transistor, the gate electrode T22 of the second transistor is disposed across the active layer of the second transistor, the gate electrode T32 of the third transistor is disposed across the active layer of the third transistor, the gate electrode T42 of the fourth transistor is disposed across the active layer of the fourth transistor, the gate electrode T52 of the fifth transistor is disposed across the active layer of the fifth transistor, the gate electrode T62 of the sixth transistor is disposed across the active layer of the sixth transistor, the gate electrode T72 of the seventh transistor is disposed across the active layer of the seventh transistor, and the gate electrode T82 of the eighth transistor is disposed across the active layer of the eighth transistor, that is, the extension direction of the gate electrode of at least one transistor is perpendicular to the extension direction of the active layer.

In an exemplary embodiment, this process further includes a conductorization processing. Conductorization processing is that after a first conductive layer pattern is formed, using a semiconductor layer in a control electrode masking region of a plurality of transistors (i.e., the region where the semiconductor layer overlaps the control electrode) as the channel region of the transistor, the semiconductor layer in the region not masked by the first conductive layer is processed into a conductorized layer to form the first electrode connection part and the second electrode connection part of the transistor. As shown in FIG. 7B, the second electrode connection part of the active layer of the third transistor can be multiplexed as the first electrode T63 of the sixth transistor, the second electrode T24 of the second transistor and the second electrode T34 of the third transistor, and the second electrode connection part of the active layer of the third transistor can be multiplexed as the second electrode T54 of the fifth transistor, the first electrode T33 of the third transistor and the second electrode T44 of the fourth transistor.

Figure 8A:
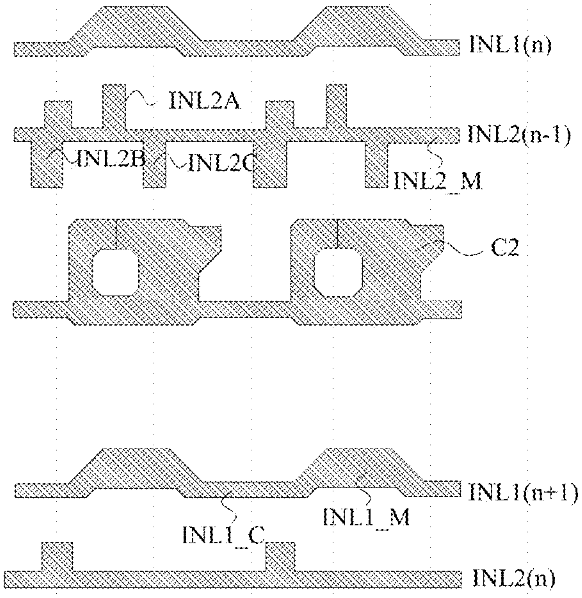
FIG. 8A is a schematic diagram of a second conductive layer pattern.
Figure 8B:
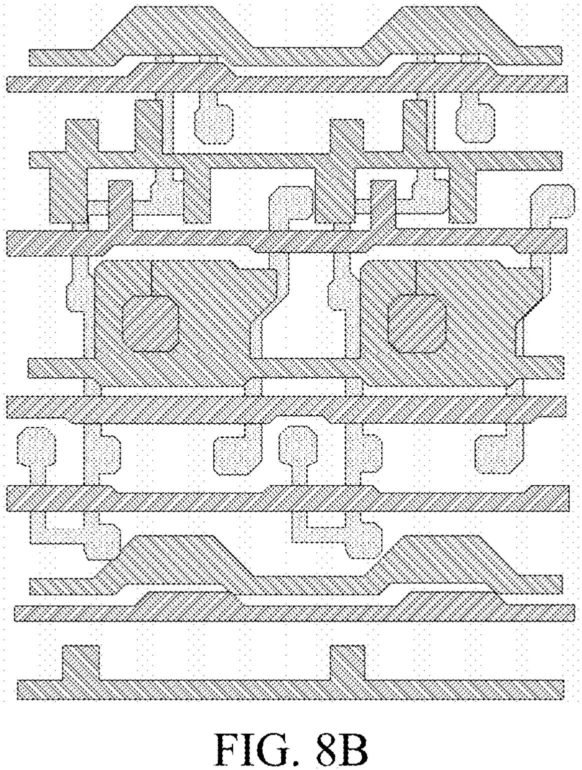
FIG. 8B is a schematic diagram after a second conductive layer pattern is formed.

(3) Forming a second conductive layer pattern, which includes: depositing a second insulating film and a second conductive film sequentially on the base substrate on which the aforementioned patterns are formed, and patterning the second insulating film and the second conductive film using a patterning process to form a second insulating layer pattern and the second conductive layer pattern on the second insulating layer, as shown in FIGS. 8A and 8B, FIG. 8A is a schematic diagram of a second conductive layer pattern and FIG. 8B is a schematic diagram after a second conductive layer pattern is formed.

In an exemplary embodiment, as shown in FIGS. 8A and 8B, the second conductive layer may include a plurality of first initial signal lines INL1, a plurality of second initial signal lines INL2 extending in the first direction and arranged in the second direction, and a second plate C2 of a capacitor located in at least one pixel circuit, INL1(*i*) is the ith first initial signal line, and INL2(*i*) is the ith second initial signal line in FIG. 8A.

In an exemplary embodiment, as shown in FIGS. 8A and 8B, the first initial signal line and the second initial signal line connected to the pixel circuit are located on opposite sides of the second plate of the capacitor of the pixel circuit respectively, that is, the first initial signal line connected to the pixel circuit is located on one side of the second plate of the capacitor of the pixel circuit, and the second initial signal line connected to the pixel circuit is located on the other side of the second plate of the capacitor of the pixel circuit.

In an exemplary embodiment, the second initial signal line INL2 (i−1) connected to the pixel circuit in row i−1 is located between the first initial signal line INL1(*i*) connected to the pixel circuit in row i and the second plate C2 of the capacitor of the pixel circuit in row i.

In an exemplary embodiment, the orthographic projection of the first reset signal line connected to the pixel circuit in row i on the base substrate is located between the orthographic projection of the first initial signal line connected to the pixel circuit in row i on the base substrate and the orthographic projection of the second initial signal line connected to the pixel circuit in row i−1 on the base substrate.

In an exemplary embodiment, the orthographic projection of the scanning signal line connected to the pixel circuit in row i on the base substrate is between the orthographic projection of the second initial signal line connected to the pixel circuit in row i−1 on the base substrate and the orthographic projection of the second plate of the capacitor of the pixel circuit in row i on the base substrate.

In an exemplary embodiment, the orthographic projection of the second plate of the capacitor of the pixel circuit on the base substrate at least partially overlaps the orthographic projection of the first plate of the capacitor on the base substrate, and the second plate of the capacitor is provided with a via exposing the first plate of the capacitor.

In an exemplary embodiment, the second plates C2 of the capacitors of adjacent pixel circuits located in a same row are connected. The electrical connection of the second plates C2 of the capacitors of adjacent pixel circuits located in a same row can improve the display uniformity of the display substrate.

In an exemplary embodiment, the first initial signal line includes a plurality of first initial body parts INL1_M and a plurality of first initial connection parts INL1_C disposed at intervals and arranged in a first direction, wherein the first initial connection part is configured to connect two adjacent first initial body parts.

In an exemplary embodiment, the length of the first initial body part in the second direction is greater than the length of the first initial connection part in the second direction.

In an exemplary embodiment, the orthographic projection of the first initial body part on the base substrate partially overlaps the orthographic projection of the active layer of the first transistor on the base substrate, and there is no overlapping area between the orthographic projection of the first initial connection part on the base substrate and the orthographic projection of the active layer of the first transistor on the base substrate.

In an exemplary embodiment, the second initial signal line includes a second initial body part INL2_M extending in a first direction, a first connection part INL2A located at a first side of the second initial body part INL2_M, and a second connection part INL2B and a third connection part INL2C located at a second side of the second initial body part INL2_M, wherein the first side and the second side are oppositely arranged. The first side is the side close to the second plate of the capacitor of the pixel circuit connected to the second initial signal line.

In an exemplary embodiment, the first connection part INL2A extends in the second direction, and has an orthographic projection on the base substrate that at least partially overlaps the orthographic projection of the active layer of the first transistor on the base substrate. The orthographic projection of the first connection part INL2A on the base substrate and the orthographic projection of the active layer of the first transistor on the base substrate at least partially overlap, which can ensure the stability of the current of the first transistor and improve the display effect of the display panel.

In an exemplary embodiment, the second connection part INL2B extends in the second direction, and has an orthographic projection on the base substrate that at least partially overlaps the orthographic projection of the active layer of the second transistor on the base substrate. The orthogonal projection of the second connection part on the base substrate and the orthogonal projection of the active layer of the second transistor on the base substrate at least partially overlap, which can ensure the stability of the current of the second transistor and improve the display effect of the display panel.

In an exemplary embodiment, the third connection part INL2C extends in the second direction, and there is no overlapping area between the orthographic projection of the third connection part on the base substrate and the orthographic projections of the active layer of the first transistor and the active layer of the second transistor on the base substrate.

In an exemplary embodiment, each of the length of the first connection part INL2A in the second direction to the length of the third connection part INL2C in the second direction is greater than the length of the second initial body part in the second direction.

Figure 9A:
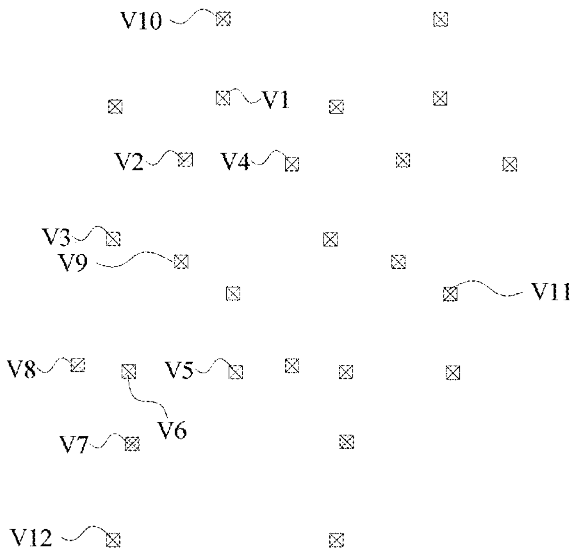
FIG. 9A is a schematic diagram of a third insulation layer pattern.
Figure 9B:
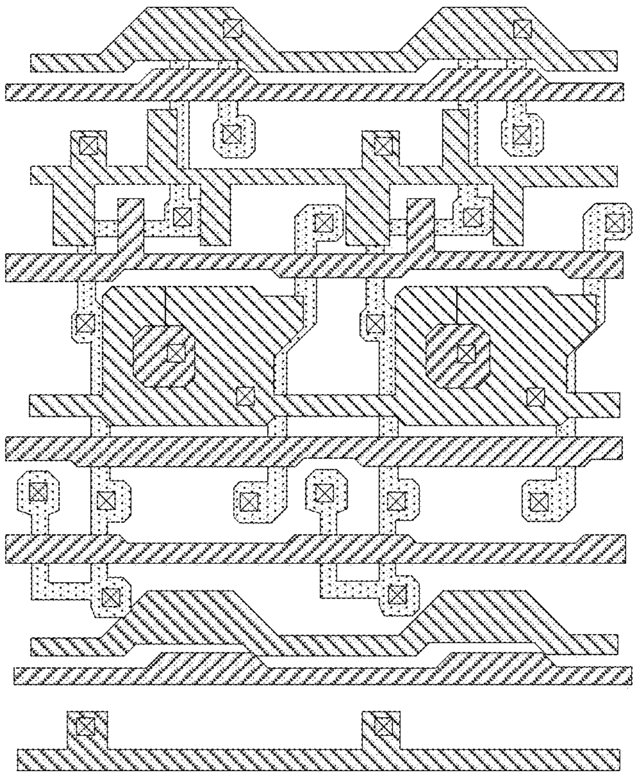
FIG. 9B is a schematic diagram after a third insulation layer pattern is formed.

(4) Forming a third insulating layer pattern, which includes: depositing a third insulating film on the base substrate on which the aforementioned patterns are formed, patterning the third insulating film using a patterning process to form the third insulating layer pattern covering the aforementioned patterns, and the third insulating layer is provided with a plurality of via patterns, as shown in FIGS. 9A to 9B, FIG. 9A is a schematic diagram of a third insulation layer pattern, and FIG. 9B is a schematic diagram after a third insulation layer pattern is formed.

In an exemplary embodiment, as shown in FIGS. 9A and 9B, the plurality of via patterns includes: a first via V1 to an eighth via V8 provided in the first insulating layer, the second insulating layer, and the third insulating layer, a ninth via V9 provided in the second insulating layer and the third insulating layer, and a tenth via V10 to a twelfth via V12 provided in the third insulating layer. For at least one pixel circuit, the first via V1 exposes the active layer of the first transistor, the second via V2 exposes the active layer of the second transistor, the third via V3 exposes the second electrode connection part of the active layer of the third transistor, the fourth via V4 exposes the active layer of the fourth transistor, the fifth via V5 exposes the active layer of the fifth transistor, and the sixth via V6 exposes the active layer of the sixth transistor, the seventh via V7 exposes the active layer of the seventh transistor, the eighth via V8 exposes the active layer of the eighth transistor, the ninth via V9 exposes the first plate of the capacitor, the tenth via V10 exposes the first initial signal line connected to the pixel circuit, the eleventh via V11 exposes the second plate of the capacitor, and the twelfth via V12 exposes the second initial signal line connected to the pixel circuit.

In an exemplary embodiment, a virtual straight line extending in the second direction passes through the active layer of the eighth transistor of the pixel circuit and the fourth via of the first adjacent pixel circuit, respectively.

Figure 10A:
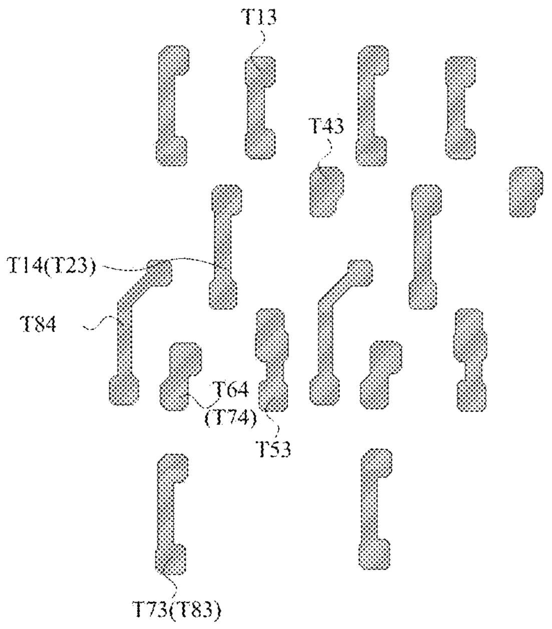
FIG. 10A is a schematic diagram of a third conductive layer pattern.
Figure 10B:
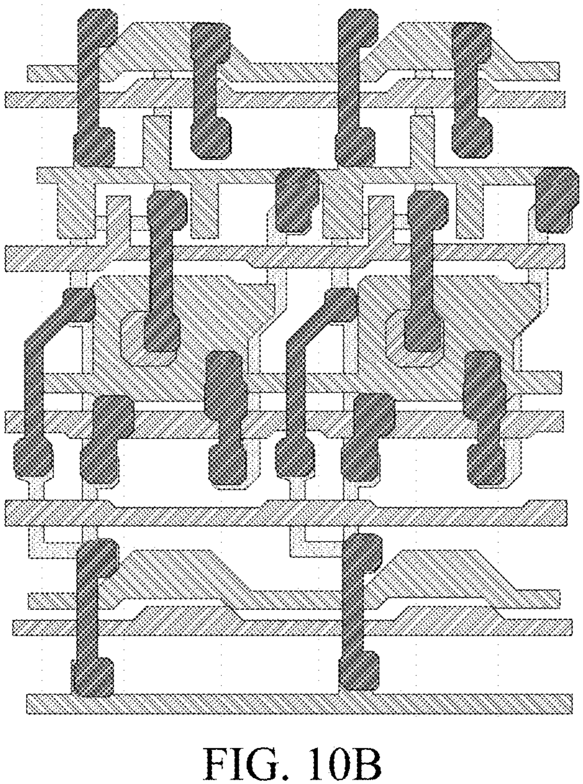
FIG. 10B is a schematic diagram after a third conductive layer pattern is formed.

(5) Forming a third conductive layer pattern, which includes: depositing a third conductive film on the base substrate on which the aforementioned patterns are formed, and patterning the third conductive film using a patterning process to form the third conductive layer pattern, as shown in FIGS. 10A and 10B, FIG. 10A is a schematic diagram of a third conductive layer pattern, and FIG. 10B is a schematic diagram after a third conductive layer pattern is formed.

In an exemplary embodiment, as shown in FIGS. 10A and 10B, the third conductive layer may include the first electrode T13 and second electrode T14 of the first transistor, the first electrode T23 of the second transistor, the first electrode T43 of the fourth transistor, the first electrode T53 of the fifth transistor, the second electrode T64 of the sixth transistor, the first electrode T73 and the second electrode T74 of the seventh transistor and the first electrode T83 and second electrode T84 of the eighth transistor.

In an exemplary embodiment, the second electrode T14 of the first transistor and the first electrode T23 of the second transistor are integrally formed, the second electrode T64 of the sixth transistor and the second electrode T74 of the seventh transistor are integrally formed, and the first electrode T73 of the seventh transistor and the first electrode T83 of the eighth transistor are integrally formed.

In an exemplary embodiment, the first electrode T13 of the first transistor, the first electrode T23 of the second transistor, the first electrode T43 of the fourth transistor, the first electrode T53 of the fifth transistor, the first electrode T73 and the second electrode T74 of the seventh transistor all extend in the second direction.

In an exemplary embodiment, the orthographic projection of the first electrode T13 of the first transistor on the base substrate partially overlaps the orthographic projections of the first initial signal line and the first reset signal line connected to the pixel circuit on the base substrate.

In an exemplary embodiment, the orthographic projection of the first electrode T23 of the second transistor on the base substrate partially overlaps the orthographic projections of the scanning signal line connected to the pixel circuit and the first plate of the capacitor on the base substrate.

In an exemplary embodiment, the orthographic projection of the first electrode T43 of the fourth transistor on the base substrate partially overlaps the orthographic projection of the second initial signal line connected to the pixel circuits in adjacent rows on the base substrate. Among them, the first electrode T43 of the fourth transistor has an orthographic projection on the base substrate that partially overlaps the orthographic projection of the second initial body part of the second initial signal line connected to the adjacent row pixel circuit on the base substrate and does not overlap the orthographic projection of the third connection part of the second initial signal line connected to the adjacent row pixel circuit on the base substrate.

In an exemplary embodiment, the orthographic projection of the fifth transistor T53 on the base substrate partially overlaps the orthographic projections of the light emitting signal line connected to the pixel circuit and the second plate of the capacitor on the base substrate.

In an exemplary embodiment, the orthographic projection of the first electrode T73 of the seventh transistor on the base substrate partially overlaps the orthographic projections of the first initial signal line and the first reset signal line connected to the pixel circuits in a next row on the base substrate.

In an exemplary embodiment, the orthographic projection of the second electrode T84 of the eighth transistor on the base substrate partially overlaps the orthographic projections of the light emitting signal line connected to the pixel circuit and the second plate of the capacitor on the base substrate.

In an exemplary embodiment, the second electrode T84 of the eighth transistor includes an electrode body part T84A and an electrode extension part T84B which are connected with each other, wherein the electrode body part T84A extends in the second direction, and the included angle between the electrode body part T84A and the electrode extension part T84B is greater than or equal to 90 degrees, or less than 180 degrees.

In an exemplary embodiment, the electrode body part T84A is electrically connected with the active layer of the eighth transistor through the eighth via, and has an orthographic projection on the base substrate that partially overlaps the orthographic projections of the light emitting signal line connected to the pixel circuit and the second plate of the capacitor on the base substrate.

In an exemplary embodiment, the electrode extension part T84B is electrically connected with the second electrode connection part of the active layer of the third transistor through the third via.

In an exemplary embodiment, a virtual straight line extending in the second direction passes through the electrode body part T84A of the pixel circuit and the fourth via of the first adjacent pixel circuit, respectively.

In an exemplary embodiment, the first electrode T13 of the first transistor is connected with the active layer of the first transistor through the first via V1 and electrically connected with the first initial signal line connected with the pixel circuit through the tenth via V10, the first electrode T23 of the second transistor is electrically connected with the active layer of the second transistor through the second via and electrically connected with the first plate of the capacitor through the ninth via, the second electrode of the eighth transistor is electrically connected with the active layer of the eighth transistor through the eighth via and the second electrode connection part of the active layer of the third transistor through the third via, the first electrode T43 of the fourth transistor is electrically connected with the active layer of the fourth transistor through the fourth via, the first electrode T53 of the fifth transistor is electrically connected with the active layer of the fifth transistor through the fifth via V5, and is electrically connected with the second plate of the capacitor through the eleventh via, the second electrode T64 of the sixth transistor is electrically connected with the active layer of the sixth transistor through the sixth via, and the first electrode T73 of the seventh transistor is electrically connected with the active layer of the seventh transistor through the seventh via V7, and is electrically connected with the second initial signal line connected with the pixel circuit through the twelfth via.

Figure 11A:
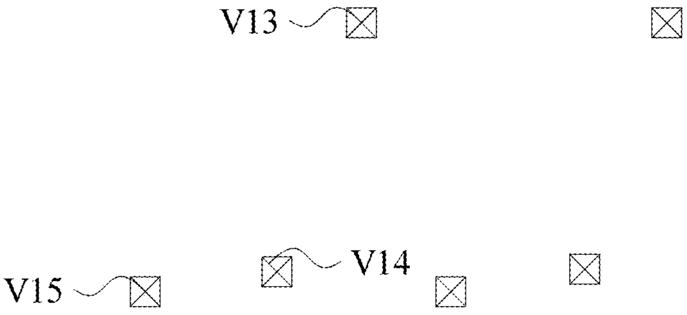
FIG. 11A is a schematic diagram of a planarization layer pattern.
Figure 11B:
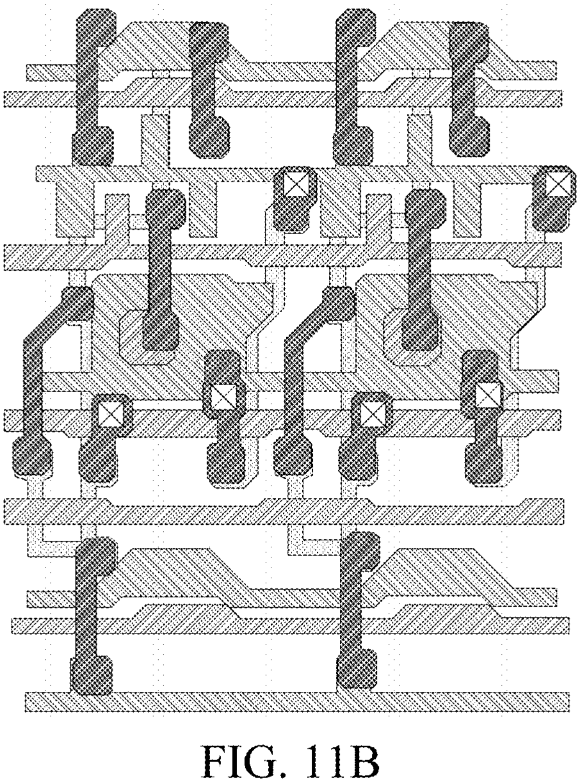
FIG. 11B is a schematic diagram after a planarization layer pattern is formed.

(6) Forming a planarization layer pattern, which includes: coating a planarization film on the base substrate on which the aforementioned patterns are formed, patterning the planarization film using a patterning process to form the planarization layer pattern covering the aforementioned patterns, and the planarization layer is provided with a plurality of via patterns, as shown in FIGS. 11A and 11B, FIG. 11A is a schematic diagram of a planarization layer pattern, and FIG. 11B is a schematic diagram after a planarization layer pattern is formed.

In an exemplary embodiment, as shown in FIGS. 11A and 11B, the plurality of via patterns include thirteenth via V13 to fifteenth via V15 in at least one pixel circuit, the vias pass through the fourth insulating layer. The thirteenth via V13 exposes the first electrode of the fourth transistor, the fourteenth via V14 exposes the first electrode of the fifth transistor, and the fifteenth via V15 exposes the second electrode of the sixth transistor.

Figure 12A:
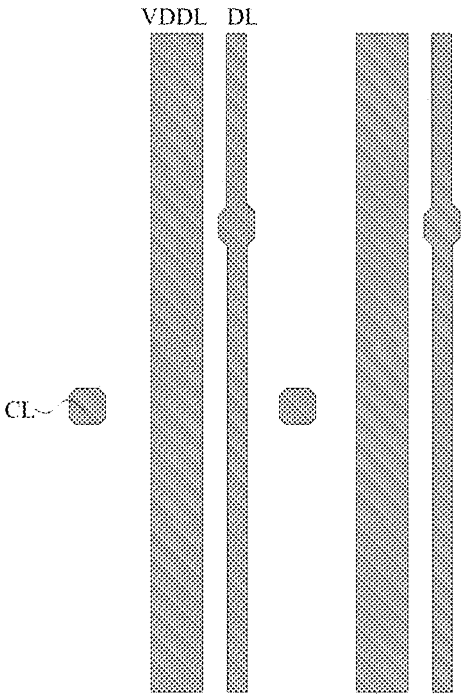
FIG. 12A is a schematic diagram of a fourth conductive layer pattern.
Figure 12B:
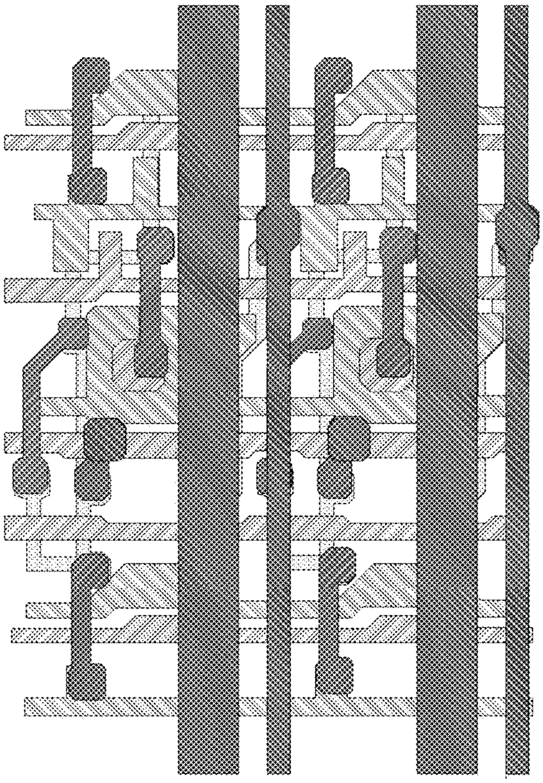
FIG. 12B is a schematic diagram after a fourth conductive layer pattern is formed.

(7) Forming a fourth conductive layer pattern, which includes: depositing a second conductive film on the base substrate on which the aforementioned patterns are formed, and patterning the second conductive film using a patterning process to form a second conductive layer pattern, as shown in FIGS. 12A and 12B, where FIG. 12A is a schematic diagram of a fourth conductive layer pattern and FIG. 12B is a schematic diagram after a fourth conductive layer pattern is formed.

In an exemplary embodiment, as shown in FIGS. 12A and 12B, the fourth conductive layer may include a plurality of first power supply lines VDDL, a plurality of data signal lines DL extending in the second direction and arranged in the first direction and a connection electrode CL. Herein, the data signal line connected to the pixel circuit is located on the side of the first power supply line connected to the pixel circuit away from the connection electrode.

In an exemplary embodiment, the length of the first power supply line VDDL in the first direction is greater than the length of the data signal line DL in the first direction.

In an exemplary embodiment, the orthographic projection of the third connection part of the second initial signal line on the base substrate is located between the orthographic projection of the first electrode of the second transistor on the base substrate and the orthographic projection of the data signal line DL on the base substrate.

In an exemplary embodiment, the data signal line DL connected to the pixel circuit is electrically connected to the first electrode of the fourth transistor through the thirteenth via, the first power supply line VDDL connected to the pixel circuit is electrically connected to the first electrode of the fifth transistor through the fourteenth via, and the connection electrode CL is electrically connected to the second electrode of the sixth transistor through the fifteenth via.

In an exemplary embodiment, the orthographic projection of the first power supply line VDDL on the base substrate at least partially overlaps the orthographic projection of the third connection part of the second initial signal line on the base substrate.

In an exemplary embodiment, there is no overlapping area between the orthographic projection of the data signal line DL on the base substrate and the orthographic projection of the third connection part of the second initial signal line on the base substrate.

In an exemplary embodiment, the orthographic projection of the data signal line DL on the base substrate at least partially overlaps the orthographic projection of the electrode body part of the first adjacent pixel circuit of the pixel circuit connected to the data signal line DL.

In an exemplary embodiment, the orthographic projection of the third connection part of the second initial signal line on the base substrate is located between the orthographic projection of the first electrode of the second transistor on the base substrate and the orthographic projection of the data signal line on the base substrate. The orthographic projection of the third connection part of the second initial signal line on the base substrate is located between the orthographic projection of the first electrode of the second transistor on the base substrate and the orthographic projection of the data signal line on the base substrate, so that the third connection part of the second initial signal line can shield the first electrode of the second transistor and the data signal line and improve the display effect of the display substrate.

Figure 13A:
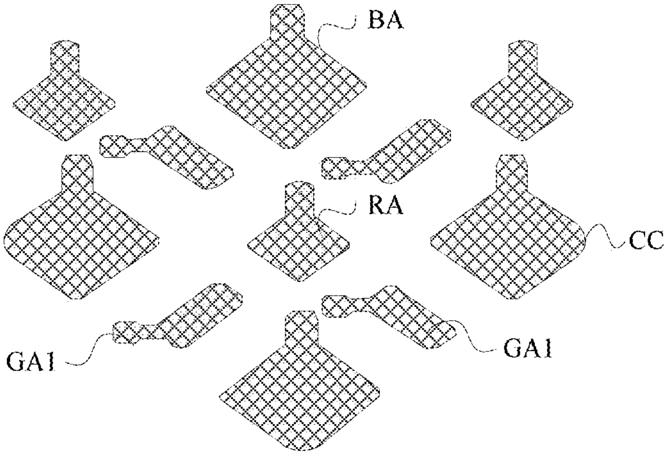
FIG. 13A is a schematic diagram of an anode layer pattern.
Figure 13B:
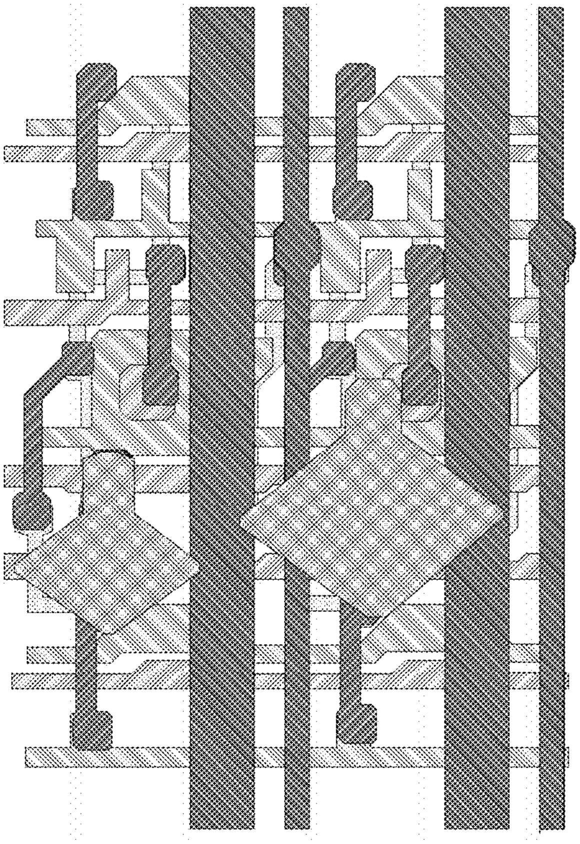
FIG. 13B is a schematic diagram after an anode layer pattern is formed.

(8) Forming an anode layer, which includes: coating a second planarization film on the base substrate on which the aforementioned patterns are formed, patterning the second planarization film to form a second planarization layer pattern, depositing a transparent conductive film on the base substrate on which the aforementioned patterns are formed, and patterning the transparent conductive film using a patterning process to form an anode layer pattern, as shown in FIGS. 13A and 13B, FIG. 13A is a schematic diagram of an anode layer and FIG. 13B is a schematic diagram after an anode layer is formed. Herein, FIG. 13B is illustrated by forming the anodes on two pixel circuits as an example.

In an exemplary embodiment, the anode layer includes an anode RA of a first light emitting element, an anode BA of a second light emitting element, an anode GA1 of a third light emitting element, and an anode GA2 of a fourth light emitting element.

In an exemplary embodiment, as shown in FIG. 13A, the area of the anode BA of the second light emitting element is larger than that of the anode RA of the first light emitting element, and the anode GA1 of the third light emitting element and the anode GA2 of the fourth light emitting element are symmetrical about a virtual straight line extending in the first direction.

In an exemplary embodiment, as shown in FIG. 13A, a virtual straight line extending in the first direction passes through the anode RA of the first light emitting element and the anode BA of the second light emitting element, and a virtual straight line extending in the second direction passes through the anode RA of the first light emitting element and the anode BA of the second light emitting element.

In an exemplary embodiment, a virtual straight line extending in the first direction passes through the anode GA1 of the third light emitting element and the anode GA2 of the fourth light emitting element. A virtual straight line extending in the second direction passes through the anode GA1 of the third light emitting element and the anode GA2 of the fourth light emitting element.

In an exemplary embodiment, the anodes of four first light emitting elements, anodes of two third light emitting elements and anodes of two fourth light emitting elements are arranged around the anode of the second light emitting element.

In an exemplary embodiment, the shape of the boundary of the anode BA of at least one second light emitting element includes at least one rounded corner CC1.

Figure 14A:
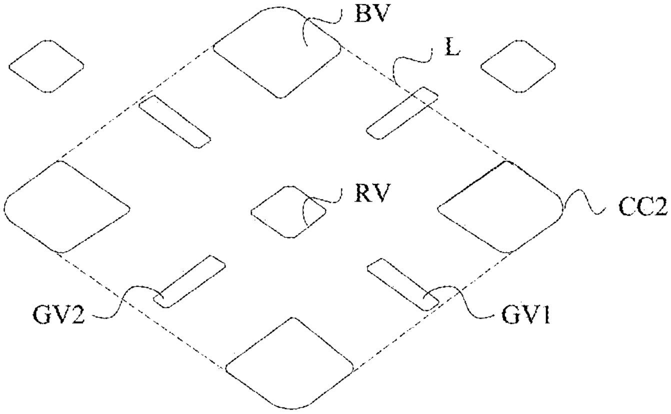
FIG. 14A is a schematic diagram of a pixel definition layer pattern.
Figure 14B:
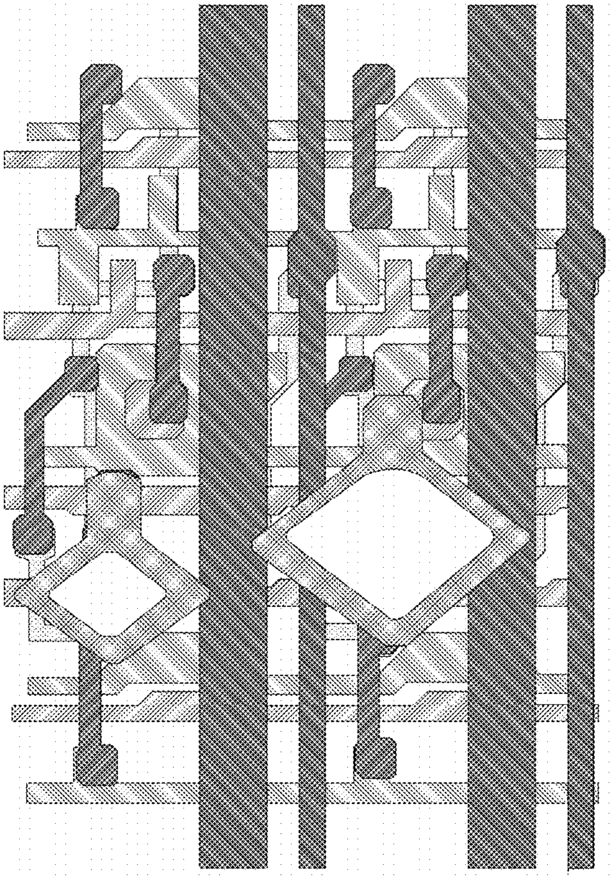
FIG. 14B is a schematic diagram after a pixel definition layer pattern is formed.

(9) Forming a pixel definition layer, which includes: depositing a pixel definition film on the base substrate on which the aforementioned patterns are formed, and patterning the pixel definition film using a patterning process to form a pixel definition layer pattern exposing the anode of the light emitting element, as shown in FIGS. 14A and 14B, FIG. 14A is a schematic diagram of a pixel definition layer, and FIG. 14B is a schematic diagram after a pixel definition layer is formed. FIG. 14B is illustrated by forming the pixel definition layers on two pixel circuits as an example.

In an exemplary embodiment, as shown in FIG. 14A, the pixel definition layer includes a first anode via RV, a second anode via BV, a third anode via GV1 and a fourth anode via GV2. The first anode via RV exposes the anode of the first light emitting element, the second anode via BV exposes the anode of the second light emitting element, the third anode via GV1 exposes the anode of the third light emitting element, and the fourth anode via GV2 exposes the anode of the fourth light emitting element.

In an exemplary embodiment, as shown in FIG. 14A, the shape of the boundary of the second anode via includes a plurality of rounded corners CC2, one of which is located on the side of the second anode via BV away from the surrounded first anode via RV, and the rounded corners, away from the first anode via RV, of four second anode vias BV surrounding the first anode via RV form four rounded corners of a rounded corner diamond L, and the second anode via BV passes through the center line of the rounded corner diamond.

(10) Forming an organic structure layer and a cathode layer, which includes: coating an organic light emitting material on the base substrate on which the aforementioned patterns are formed, patterning the organic light emitting material using a patterning process to form an organic structure layer pattern, depositing a cathode film on the base substrate on which the organic material layer pattern is formed, and patterning the cathode film using a patterning process to form the cathode layer.

In an exemplary embodiment, the organic structure layer may include an organic light emitting layer of a light emitting element.

In an exemplary embodiment, the cathode layer may include a cathode of a light emitting element.

In an exemplary embodiment, the semiconductor layer may be an amorphous silicon layer, a poly silicon layer, or may be a metal oxide layer. The metal oxide layer may be made of an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, etc. The metal oxide layer may be a single layer, or a double-layer, or may be a multi-layer.

In an exemplary embodiment, the first conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the first conductive layer may include: molybdenum.

In an exemplary embodiment, the second conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the second conductive layer may include: molybdenum.

In an exemplary embodiment, the third conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, the third conductive layer may be of a three-layer stacked structure formed of titanium, aluminum, and titanium.

In an exemplary embodiment, the fourth conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be of a three-layer stacked structure formed of titanium, aluminum, and titanium.

In an exemplary embodiment, the anode layer may employ transparent conductive materials, such as any one or more of indium gallium zinc oxide (a-IGZO), zinc oxynitride (ZnON) and indium zinc tin oxide (IZTO).

In an exemplary embodiment, the cathode layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be of a three-layer stacked structure formed of titanium, aluminum, and titanium.

In an exemplary embodiment, the first insulation layer, the second insulation layer and the third insulation layer may be made of any one or more of Silicon Oxide (SiOx), Silicon Nitride (SiNx), and Silicon Oxynitride (SiON), and may be a single layer, a multi-layer, or a composite layer. The first insulating layer may be called a first gate insulating layer, the second insulating layer may be called a second gate insulating layer, and the third insulating layer may be called an interlayer insulating layer.

In an exemplary embodiment, the planarization layer may be made of an organic material.

The display substrate according to the embodiment of the present disclosure may be applied to display products with any resolution.

The embodiment of the present disclosure further provides a driving method for a pixel circuit, which is configured to drive the pixel circuit. The driving method for the pixel circuit according to an embodiment of the present disclosure can include the following steps:

In step 100. in a first initialization stage, the first node control sub-circuit provides the signal of the first initial signal terminal to the first node under the control of the first reset signal terminal.

In step 200, in a data writing stage, the first node control sub-circuit provides the signal of the third node to the first node and the signal of the data signal terminal to the second node under the control of the scanning signal terminal;

In step 300, in a second initialization stage, the second node control sub-circuit provides the signal of the second initial signal terminal to the fourth node under the control of the second reset signal terminal;

In step 400, in a light emitting stage, the driving sub-circuit provides a driving current to the third node under the control of the first node and the second node, and the light emitting control sub-circuit provides the signal of the first power supply terminal to the second node and the signal of the third node to the fourth node under the control of the light emitting signal terminal.

The display substrate is the display substrate according to any of the aforementioned embodiments, and has similar implementation principles and implementation effects, which will not be repeated here.

In an exemplary embodiment, the driving method of the display substrate may further include: in the second initialization stage, the second node control sub-circuit provides the signal of the second initial signal terminal to the third node under the control of the second reset signal terminal.

An embodiment of the present disclosure further provides a display apparatus including a display substrate.

The display substrate is the display substrate according to any of the aforementioned embodiments, and has similar implementation principles and implementation effects, which will not be repeated here.

In an exemplary embodiment, the display apparatus may be any product or component with a display function, such as a liquid crystal panel, electronic paper, an OLED panel, an Active-Matrix Organic Light Emitting Diode (AMOLED for short) panel, a mobile phone, a tablet computer, a television, a display, a notebook computer, a digital photo frame, or a navigator.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure are enlarged. It may be understood that when an element such as a layer, a film, a region, or a substrate is described as being "on" or "under" another element, the element may be "directly" located "on" or "under" the other element, or there may be an intermediate element.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A pixel circuit, configured to drive a light emitting element to emit light, wherein:

the pixel circuit comprises: a first node control sub-circuit, a second node control sub-circuit, a light emitting control sub-circuit and a driving sub-circuit; a working process of the pixel circuit comprises a first initialization stage, a data writing stage, a second initialization stage and a light emitting stage;

the first node control sub-circuit is electrically connected with a first power supply terminal, a first reset signal terminal, a first initial signal terminal, a scanning signal terminal, a data signal terminal, a first node, a second node and a third node respectively, and is configured to provide a signal of the first initial signal terminal to the first node under control of the first reset signal terminal, provide a signal of the third node to the first node and a signal of the data signal terminal to the second node under control of the scanning signal terminal;

the second node control sub-circuit is electrically connected with a second reset signal terminal, a second initial signal terminal and a fourth node respectively, and is configured to provide a signal of the second initial signal terminal to the fourth node under control of the second reset signal terminal;

the driving sub-circuit is electrically connected with the first node, the second node and the third node respectively, and is configured to provide a driving current to the third node under control of the first node and the second node;

the light emitting control sub-circuit is electrically connected with a light emitting signal terminal, the first power supply terminal, the second node, the third node and the fourth node respectively, and is configured to provide a signal of the first power supply terminal to the second node and a signal of the third node to the fourth node under control of the light emitting signal terminal;

the light emitting element is electrically connected with the fourth node and a second power supply terminal respectively;

the second initialization stage is between the data writing stage and the light emitting stage, and a signal of the second reset signal terminal is an effective level signal in the second initialization stage, and the signal of the second reset signal terminal and a signal of the light emitting signal terminal are mutually inverted signals in the second initialization stage;

the first node control sub-circuit comprises a first transistor, a second transistor, a fourth transistor and a capacitor, and the capacitor comprises a first plate and a second plate; the driving sub-circuit comprises a third transistor, and the light emitting control sub-circuit comprises a fifth transistor and a sixth transistor;

a control electrode of the first transistor is electrically connected with the first reset signal terminal, a first electrode of the first transistor is electrically connected with the first initial signal terminal, and a second electrode of the first transistor is electrically connected with the first node;

a control electrode of the second transistor is electrically connected with the scanning signal terminal, a first electrode of the second transistor is electrically connected with the first node, and a second electrode of the second transistor is electrically connected with the third node;

a control electrode of the third transistor is electrically connected with the first node, a first electrode of the third transistor is electrically connected with the second node, and a second electrode of the third transistor is electrically connected with the third node;

a control electrode of the fourth transistor is electrically connected with the scanning signal terminal, a first electrode of the fourth transistor is electrically connected with the data signal terminal, and a second electrode of the fourth transistor is electrically connected with the second node;

a control electrode of the fifth transistor is electrically connected with the light emitting signal terminal, a first electrode of the fifth transistor is electrically connected with the first power supply terminal, and a second electrode of the fifth transistor is electrically connected with the second node;

a control electrode of the sixth transistor is electrically connected with the light emitting signal terminal, a first electrode of the sixth transistor is electrically connected with the third node, and a second electrode of the sixth transistor is electrically connected with the fourth node; and the first plate of the capacitor is electrically connected with the first node, and the second plate of the capacitor is electrically connected with the first power supply terminal.

2. The pixel circuit according to claim 1, wherein the second node control sub-circuit is further electrically connected with the third node, and is further configured to provide the signal of the second initial signal terminal to the third node under control of the second reset signal terminal.

3. The pixel circuit according to claim 2, wherein the second node control sub-circuit comprises a seventh transistor and an eighth transistor;

a control electrode of the seventh transistor is electrically connected with the second reset signal terminal, a first electrode of the seventh transistor is electrically connected with the second initial signal terminal, and a second electrode of the seventh transistor is electrically connected with the fourth node; and a control electrode of the eighth transistor is electrically connected with the second reset signal terminal, a first electrode of the eighth transistor is electrically connected with the second initial signal terminal, and a second electrode of the eighth transistor is electrically connected with the third node.

4. The pixel circuit according to claim 2, wherein the first node control sub-circuit comprises a first transistor, a second transistor, a fourth transistor and a capacitor, and the capacitor comprises a first plate and a second plate; the driving sub-circuit comprises a third transistor, the light emitting control sub-circuit comprises a fifth transistor and a sixth transistor, and the second node control sub-circuit comprises a seventh transistor and an eighth transistor;

a control electrode of the first transistor is electrically connected with the first reset signal terminal, a first electrode of the first transistor is electrically connected with the first initial signal terminal, and a second electrode of the first transistor is electrically connected with the first node;

a control electrode of the second transistor is electrically connected with the scanning signal terminal, a first electrode of the second transistor is electrically connected with the first node, and a second electrode of the second transistor is electrically connected with the third node;

a control electrode of the third transistor is electrically connected with the first node, a first electrode of the third transistor is electrically connected with the second node, and a second electrode of the third transistor is electrically connected with the third node;

a control electrode of the fourth transistor is electrically connected with the scanning signal terminal, a first electrode of the fourth transistor is electrically connected with the data signal terminal, and a second electrode of the fourth transistor is electrically connected with the second node;

a control electrode of the fifth transistor is electrically connected with the light emitting signal terminal, a first electrode of the fifth transistor is electrically connected with the first power supply terminal, and a second electrode of the fifth transistor is electrically connected with the second node;

a control electrode of the sixth transistor is electrically connected with the light emitting signal terminal, a first electrode of the sixth transistor is electrically connected with the third node, and a second electrode of the sixth transistor is electrically connected with the fourth node;

a control electrode of the seventh transistor is electrically connected with the second reset signal terminal, a first electrode of the seventh transistor is electrically connected with the second initial signal terminal, and a second electrode of the seventh transistor is electrically connected with the fourth node;

a control electrode of the eighth transistor is electrically connected with the second reset signal terminal, a first electrode of the eighth transistor is electrically connected with the second initial signal terminal, and a second electrode of the eighth transistor is electrically connected with the third node; and the first plate of the capacitor is electrically connected with the first node, and the second plate of the capacitor is electrically connected with the first power supply terminal.

5. The pixel circuit according to claim 1, wherein a signal of the first reset signal terminal is an effective level signal in the first initialization stage, a signal of the scanning signal terminal is an effective level signal in the data writing stage, and the signal of the light emitting signal terminal is an effective level signal in the light emitting stage;

based on a determination that the signal of the second reset signal terminal is an effective level signal, the signal of the light emitting signal terminal is an invalid level signal, and based on a determination that the signal of the light emitting signal terminal is an effective level signal, the signal of the second reset signal terminal is an invalid level signal; and a frequency at which the signal of the light emitting signal terminal is an effective level signal is the same as a frequency at which the signal of the second reset signal terminal is an effective level signal.

6. The pixel circuit according to claim 1, wherein the second node control sub-circuit comprises a seventh transistor; and a control electrode of the seventh transistor is electrically connected with the second reset signal terminal, a first electrode of the seventh transistor is electrically connected with the second initial signal terminal, and a second electrode of the seventh transistor is electrically connected with the fourth node.

7. The pixel circuit according to claim 1, wherein the first node control sub-circuit comprises a first transistor, a second transistor, a fourth transistor and a capacitor, and the capacitor comprises a first plate and a second plate; the driving sub-circuit comprises a third transistor, the light emitting control sub-circuit comprises a fifth transistor and a sixth transistor, and the second node control sub-circuit comprises a seventh transistor;

a control electrode of the first transistor is electrically connected with the first reset signal terminal, a first electrode of the first transistor is electrically connected with the first initial signal terminal, and a second electrode of the first transistor is electrically connected with the first node;

a control electrode of the second transistor is electrically connected with the scanning signal terminal, a first electrode of the second transistor is electrically connected with the first node, and a second electrode of the second transistor is electrically connected with the third node;

a control electrode of the third transistor is electrically connected with the first node, a first electrode of the third transistor is electrically connected with the second node, and a second electrode of the third transistor is electrically connected with the third node;

a control electrode of the fourth transistor is electrically connected with the scanning signal terminal, a first electrode of the fourth transistor is electrically connected with the data signal terminal, and a second electrode of the fourth transistor is electrically connected with the second node;

a control electrode of the fifth transistor is electrically connected with the light emitting signal terminal, a first electrode of the fifth transistor is electrically connected with the first power supply terminal, and a second electrode of the fifth transistor is electrically connected with the second node;

a control electrode of the sixth transistor is electrically connected with the light emitting signal terminal, a first electrode of the sixth transistor is electrically connected with the third node, and a second electrode of the sixth transistor is electrically connected with the fourth node;

a control electrode of the seventh transistor is electrically connected with the second reset signal terminal, a first electrode of the seventh transistor is electrically connected with the second initial signal terminal, and a second electrode of the seventh transistor is electrically connected with the fourth node; and the first plate of the capacitor is electrically connected with the first node, and the second plate of the capacitor is electrically connected with the first power supply terminal.

8. A display substrate, comprising: a base substrate, and a circuit structure layer and a light emitting structure layer sequentially arranged on the base substrate, wherein the light emitting structure layer comprises light emitting elements, and the circuit structure layer comprises pixel circuits disposed in an array according to claim 1.

9. The display substrate according to claim 8, further comprising a plurality of first reset signal lines, a plurality of second reset signal lines, a plurality of scanning signal lines, a plurality of light emitting signal lines, a plurality of first initial signal lines and a plurality of second initial signal lines extending in a first direction and arranged in a second direction, and a plurality of first power supply lines and a plurality of data signal lines extending in the second direction and arranged in the first direction, wherein the first direction and the second direction are intersected; and the first reset signal terminal of the pixel circuit is electrically connected with the first reset signal line, the second reset signal terminal is electrically connected with the second reset signal line, the scanning signal terminal is electrically connected with the scanning signal line, the light emitting signal terminal is electrically connected with the light emitting signal line, the first initial signal terminal is electrically connected with the first initial signal line, the second initial signal terminal is electrically connected with the second initial signal line, the first power supply terminal is electrically connected with the first power supply line, and the data signal terminal is electrically connected with the data signal line.

10. The display substrate according to claim 9, wherein based on a determination that the pixel circuit comprises a first transistor to an eighth transistor and a capacitor, the circuit structure layer comprises a semiconductor layer, a first insulating layer, a first conductive layer, a second insulating layer, a second conductive layer, a third insulating layer, a third conductive layer, a planarization layer and a fourth conductive layer which are sequentially stacked on the base substrate;

the semiconductor layer comprises an active layer of the first transistor to an active layer of the eighth transistor located in at least one pixel circuit;

the first conductive layer comprises a first reset signal line, a second reset signal line, a scanning signal line, a light emitting signal line, and a first plate of the capacitor and a control electrode of the first transistor to a control electrode of the eighth transistor located in at least one pixel circuit;

the second conductive layer comprises a first initial signal line, a second initial signal line, and a second plate of the capacitor located in at least one pixel circuit, wherein the second plates of capacitors of adjacent pixel circuits located in a same row are connected;

the third conductive layer comprises a first electrode and a second electrode of the first transistor, a first electrode of the second transistor, a first electrode of the fourth transistor, a first electrode of the fifth transistor, a second electrode of the sixth transistor, a first electrode and a second electrode of the seventh transistor, and a first electrode and a second electrode of the eighth transistor; and the fourth conductive layer comprises a first power supply line and a data signal line.

11. The display substrate according to claim 10, wherein the active layer of each transistor comprises a channel region and a first electrode connection part and a second electrode connection part respectively located at two sides of the channel region;

the first electrode connection part of the active layer of the third transistor is multiplexed as a first electrode of the third transistor, a second electrode of the fourth transistor and a second electrode of the fifth transistor; and the second electrode connection part of the active layer of the third transistor is multiplexed as a second electrode of the second transistor, a second electrode of the third transistor and a first electrode of the sixth transistor.

12. The display substrate according to claim 11, wherein the first insulating layer, the second insulating layer and the third insulating layer are provided with first via hole to eighth via hole, the third via hole exposes the second electrode connection part of the active layer of the third transistor, the fourth via hole exposes the active layer of the fourth transistor, and the eighth via exposes the active layer of the eighth transistor;

a second electrode of the eighth transistor comprises an electrode body part and an electrode extension part which are connected with each other, wherein the electrode body part is extended in the second direction, and an included angle between the electrode body part and the electrode extension part is greater than or equal to 90 degrees or less than 180 degrees;

the electrode body part is electrically connected with the active layer of the eighth transistor through the eighth via hole, and an orthographic projection of the electrode body part on the base substrate is partially overlapped with orthographic projections of the light emitting signal line connected to the pixel circuit and the second plate of the capacitor on the base substrate; and the electrode extension part is electrically connected with the second electrode connection part of the active layer of the third transistor through the third via hole.

13. The display substrate according to claim 12, wherein adjacent pixel circuits located in a same row with the pixel circuit comprise a first adjacent pixel circuit and a second adjacent pixel circuit, the first adjacent pixel circuit is located on a side of the first power supply line connected to the pixel circuit away from the data signal line, and the second adjacent pixel circuit is located on a side of the data signal line connected to the pixel circuit away from the first power supply line;

a virtual straight line extending in the second direction passes through the active layer of the eighth transistor of the pixel circuit and a fourth via hole of the first adjacent pixel circuit respectively; and a virtual straight line extending in the second direction passes through the electrode body part of the pixel circuit and the fourth via hole of the first adjacent pixel circuit respectively.

14. The display substrate according to claim 13, wherein an orthographic projection of the first power supply line connected to the pixel circuit on the base substrate is located between an orthographic projection of the data signal line connected to the pixel circuit on the base substrate and an orthographic projection of the second electrode of the first transistor of the pixel circuit on the base substrate;

the orthographic projection of the first power supply line on the base substrate is at least partially overlapped with an orthographic projection of an third connection part of the second initial signal line on the base substrate; and the orthographic projection of the data signal line on the base substrate is at least partially overlapped with an orthographic projection of an electrode body part of the first adjacent pixel circuit of the pixel circuit connected to the data signal line.

15. The display substrate according to claim 10, wherein the first reset signal line and the scanning signal line connected to the pixel circuit are located on a same side of the first plate of the pixel circuit, and the first reset signal line is located on a side of the scanning signal line away from the first plate of the pixel circuit;

the light emitting signal line and the second reset signal line connected to the pixel circuit are located on a side of the first plate of the pixel circuit away from the scanning signal line, and the second reset signal line is located on a side of the light emitting signal line away from the first plate of the pixel circuit;

the first initial signal line and the second initial signal line connected to the pixel circuit are respectively located on opposite sides of the second plate of the capacitor of the pixel circuit, and the second initial signal line connected to the pixel circuit in row i−1 is located between the first initial signal line connected to the pixel circuit in row i and the second plate of the capacitor of the pixel circuit in row i;

an orthographic projection of the first reset signal line connected to the pixel circuit in row i on the base substrate is located between the orthographic projection of the first initial signal line connected to the pixel circuit in row i on the base substrate and the orthographic projection of the second initial signal line connected to the pixel circuit in row i−1 on the base substrate; and an orthographic projection of the scanning signal line connected to the pixel circuit in row i on the base substrate is located between the orthographic projection of the second initial signal line connected to the pixel circuit in row i−1 on the base substrate and the orthographic projection of the second plate of the capacitor of the pixel circuit in row i on the base substrate.

16. The display substrate according to claim 10, wherein the first initial signal line comprises a plurality of first initial body parts and a plurality of first initial connection parts disposed at intervals and arranged in the first direction, wherein the first initial connection part is configured to connect two adjacent first initial body parts;

a length of the first initial body part in the second direction is greater than a length of the first initial connection part in the second direction; and an orthographic projection of the first initial body part on the base substrate is partially overlapped with an orthographic projection of the active layer of the first transistor on the base substrate, and there is no overlapping area between an orthographic projection of the first initial connection part on the base substrate and the orthographic projection of the active layer of the first transistor on the base substrate.

17. The display substrate according to claim 16, wherein the second initial signal line comprises a second initial body part extending in the first direction, a first connection part located at a first side of the second initial body part, and a second connection part and a third connection part located at a second side of the second initial body part, wherein the first side and the second side are oppositely disposed, and the first side is close to the second plate of the capacitor of the pixel circuit connected to the second initial signal line;

the first connection part is extended in the second direction, and an orthographic projection of the first connection part on the base substrate is at least partially overlapped with the orthographic projection of the active layer of the first transistor on the base substrate;

the second connection part is extended in the second direction, and an orthographic projection of the second connection part on the base substrate is at least partially overlapped with an orthographic projection of the active layer of the second transistor on the base substrate;

the third connection part is extended in the second direction, and an orthogonal projection of the third connection part on the base substrate is not overlapped with the orthogonal projections of the active layer of the first transistor and the active layer of the second transistor on the base substrate; and the orthographic projection of the third connection part of the second initial signal line on the base substrate is located between an orthographic projection of the first electrode of the second transistor and an orthographic projection of the data signal line on the base substrate.

18. The display substrate according to claim 8, wherein at least one light emitting element comprises an anode, an organic light emitting layer and a cathode; the light emitting structure layer comprises an anode layer, a pixel definition layer, an organic structure layer and a cathode layer which are sequentially stacked on the base substrate; the anode layer comprises an anode, the organic structure layer comprises an organic light emitting layer, and the cathode layer comprises a cathode;

the light emitting elements comprise a first light emitting element, a second light emitting element, a third light emitting element and a fourth light emitting element, the first light emitting element emits red light, the second light emitting element emits blue light, and the third light emitting element and the fourth light emitting element emit green light; an area of the anode of the second light emitting element is larger than that of the anode of the first light emitting element, and the anode of the third light emitting element and the anode of the fourth light emitting element are symmetrical about a virtual straight line extending in the first direction;

a virtual straight line extending in the first direction passes through the anode of the first light emitting element and the anode of the second light emitting element, a virtual straight line extending in the second direction passes through the anode of the first light emitting element and the anode of the second light emitting element, and a virtual straight line extending in the first direction passes through the anode of the third light emitting element and the anode of the fourth light emitting element; a virtual straight line extending in the second direction passes through the anode of the third light emitting element and the anode of the fourth light emitting element, and anodes of four second light emitting elements, anodes of two third light emitting elements and anodes of two fourth light emitting elements are disposed around the anode of the first light emitting element;

a shape of a boundary of the anode of at least one second light emitting element comprises at least one rounded corner;

the pixel definition layer comprises a first anode via hole to a fourth anode via hole, the first anode via hole exposes the anode of the first light emitting element, the second anode via hole exposes the anode of the second light emitting element, the third anode via hole exposes the anode of the third light emitting element, and the fourth anode via hole exposes the anode of the fourth light emitting element; and a shape of a boundary of the second anode via hole comprises a plurality of rounded corners, one of the rounded corners is located on a side of the second anode via hole away from the surrounded first anode via hole, rounded corners, away from the first anode via hole, of four second anode vias surrounding the first anode via are formed four rounded corners of a rounded corner diamond, and the first anode via passes through a center line of the rounded corner diamond.

19. A display apparatus, comprising: the display substrate of claim 8.

20. A pixel circuit, configured to drive a light emitting element to emit light, wherein:

the pixel circuit comprises: a first node control sub-circuit, a second node control sub-circuit, a light emitting control sub-circuit and a driving sub-circuit; a working process of the pixel circuit comprises a first initialization stage, a data writing stage, a second initialization stage and a light emitting stage;

the first node control sub-circuit is electrically connected with a first power supply terminal, a first reset signal terminal, a first initial signal terminal, a scanning signal terminal, a data signal terminal, a first node, a second node and a third node respectively, and is configured to provide a signal of the first initial signal terminal to the first node under control of the first reset signal terminal, provide a signal of the third node to the first node and a signal of the data signal terminal to the second node under control of the scanning signal terminal;

the second node control sub-circuit is electrically connected with a second reset signal terminal, a second initial signal terminal and a fourth node respectively, and is configured to provide a signal of the second initial signal terminal to the fourth node under control of the second reset signal terminal;

the driving sub-circuit is electrically connected with the first node, the second node and the third node respectively, and is configured to provide a driving current to the third node under control of the first node and the second node;

the light emitting control sub-circuit is electrically connected with a light emitting signal terminal, the first power supply terminal, the second node, the third node and the fourth node respectively, and is configured to provide a signal of the first power supply terminal to the second node and a signal of the third node to the fourth node under control of the light emitting signal terminal;

the light emitting element is electrically connected with the fourth node and a second power supply terminal respectively;

the second initialization stage is between the data writing stage and the light emitting stage, and a signal of the second reset signal terminal is an effective level signal in the second initialization stage, and the signal of the second reset signal terminal and a signal of the light emitting signal terminal are mutually inverted signals in the second initialization stage;

a signal of the first reset signal terminal is an effective level signal in the first initialization stage, a signal of the scanning signal terminal is an effective level signal in the data writing stage, and the signal of the light emitting signal terminal is an effective level signal in the light emitting stage;

based on a determination that the signal of the second reset signal terminal is an effective level signal, the signal of the light emitting signal terminal is an invalid level signal, and based on a determination that the signal of the light emitting signal terminal is an effective level signal, the signal of the second reset signal terminal is an invalid level signal; and a frequency at which the signal of the light emitting signal terminal is an effective level signal is the same as a frequency at which the signal of the second reset signal terminal is an effective level signal.

* * * * *